United States Patent
Leegate et al.

(10) Patent No.: US 10,182,477 B1
(45) Date of Patent: Jan. 15, 2019

(54) AIRCRAFT ESCAPE SLIDE LIGHTING SYSTEM WITH SELF-REGULATED, CIRCUIT-PROTECTED LUMINAIRES

(71) Applicant: BaseWest Inc., Clearwater, NJ (US)

(72) Inventors: Gary C. Leegate, St. Petersburg, FL (US); Edgar E. Cuervo, Seminole, FL (US); Andrew W. Deweerd, Clearwater, FL (US)

(73) Assignee: BASEWEST INC., Clearwater, FL (US)

( * ) Notice: Subject to any disclaimer, the term of this patent is extended or adjusted under 35 U.S.C. 154(b) by 0 days.

(21) Appl. No.: 15/815,372

(22) Filed: Nov. 16, 2017

(51) Int. Cl.
*H05B 37/02* (2006.01)
*H05B 33/08* (2006.01)
*B64D 25/14* (2006.01)

(52) U.S. Cl.
CPC ......... *H05B 33/0815* (2013.01); *B64D 25/14* (2013.01); *H05B 33/0887* (2013.01); *B64D 2203/00* (2013.01)

(58) Field of Classification Search
CPC .... H05B 33/02; H05B 33/08; H05B 33/0803; H05B 33/0806; H05B 33/0815; H05B 33/0884; H05B 33/0887; B64D 25/08; B64D 25/14
See application file for complete search history.

(56) References Cited

U.S. PATENT DOCUMENTS

| | | | |
|---|---|---|---|
| 3,463,915 A | 8/1969 | Day | |
| 3,621,383 A | 11/1971 | Rush et al. | |
| 5,444,604 A | 8/1995 | Hiner et al. | |
| 6,239,716 B1* | 5/2001 | Pross | G09G 3/14 315/200 A |
| 6,356,365 B1* | 3/2002 | Oida | H04N 1/40056 250/208.1 |
| 6,600,274 B1* | 7/2003 | Hughes | H05B 33/0812 315/291 |
| 6,966,414 B2 | 11/2005 | Zonneveld | |
| 7,018,079 B1* | 3/2006 | Franco-Vila | A62B 1/20 362/253 |
| 7,518,319 B2* | 4/2009 | Konno | H05B 33/0803 315/185 S |
| 2005/0253533 A1* | 11/2005 | Lys | H05B 33/0815 315/224 |

(Continued)

*Primary Examiner* — Jason Crawford
(74) *Attorney, Agent, or Firm* — The Marbury Law Group, PLLC

(57) ABSTRACT

Embodiments include computing devices, apparatus, and methods implemented by the apparatus for constant current regulation for luminaires of an aircraft escapes slide lighting system. In various embodiments, each of a plurality of constant current regulator circuits may be integral to a luminaire having at least one LED. Each of the constant current regulator circuits may be electrically connected in parallel to a power source. A protection circuit may be configured to provide power surge and/or reverse polarity protection to the constant current regulator circuits as a centralized protection circuit, or a decentralized plurality of protection circuits, each corresponding to a constant current regulator circuit. Testing of the escapes slide lighting system having the constant current regulator circuits may provide an unambiguous indication of whether any of the luminaires are inoperative.

10 Claims, 9 Drawing Sheets

(56) References Cited

U.S. PATENT DOCUMENTS

| | | | |
|---|---|---|---|
| 2009/0026976 A1* | 1/2009 | Pohler | H05B 33/0815 |
| | | | 315/294 |
| 2013/0114016 A1* | 5/2013 | Lim | H05B 33/0827 |
| | | | 349/43 |
| 2014/0009274 A1* | 1/2014 | Kohlmeier-Beckmann | |
| | | | B64D 25/14 |
| | | | 340/425.5 |
| 2016/0167794 A1* | 6/2016 | Kohlmeier-Beckmann | |
| | | | B64D 25/14 |
| | | | 182/18 |
| 2016/0171848 A1* | 6/2016 | Kohlmeier-Beckmann | |
| | | | B64D 47/02 |
| | | | 340/945 |
| 2016/0323972 A1* | 11/2016 | Bora | H05B 33/0842 |

* cited by examiner

AIRCRAFT ESCAPE SLIDE LIGHTING SYSTEM WITH SELF-REGULATED, CIRCUIT-PROTECTED LUMINAIRES

BACKGROUND

Electronic regulation of light emitting diode (LED) based escape slide lighting systems is provided by a centralized regulator within the aircraft escape slide lighting system coupled with individual voltage-dropping resistors located in series with the LED(s) at each LED location. In cases where the escape slide lighting system is powered directly by the aircraft's on-board emergency battery system, the centralized regulator is located on the input side of the escape slide lighting harness. When not powered by aircraft emergency batteries, the escape slide lighting systems are powered by independent batteries that are part of and packed within the escape slide system; these batteries include centralized electronic regulation circuits which condition the input power to the aircraft escape slide lighting system.

SUMMARY

Various disclosed embodiments may include apparatuses and methods for implementing an electrical current regulating circuit of a luminaire. In various embodiments, the luminaire includes at least one light emitting diode (LED), a first wire connection of the luminaire is electrically connectable to a positive power supply via a diode, and a second wire connection of the luminaire is electrically connected to a circuit ground of the luminaire and electrically connectable a power supply ground. In various embodiments the electrical current regulating circuit of the luminaire may include a voltage reference integrated circuit having a positive power supply input connection, a negative power supply input connection, and a voltage regulated output connection, an operational amplifier integrated circuit having a positive power supply connection, a negative power supply input connection, a non-inverting input connection, an inverting input connection, and an output connection, a plurality of resistors including a first resistor, a second resistor, and a third resistor, each of the plurality of resistors having a first connection end and a second connection end, a field-effect transistor having a source connection, a drain connection, and a gate connection, and a capacitor having a first connection end and a second connection end. In various embodiments, the positive power supply input connection of the voltage reference integrated circuit may be electrically connected to a cathode of the diode, the negative power supply input connection of the voltage reference integrated circuit may be electrically connected to the second wire connection via the circuit ground, and the voltage regulated output connection of the voltage reference integrated circuit may be electrically connected to the first connection end of the first resistor, the positive power supply connection of the operational amplifier integrated circuit may be electrically connected to the cathode 2 of the diode, the negative power supply input connection of the operational amplifier integrated circuit may be electrically connected to the second wire connection via the circuit ground, the non-inverting input connection of the operational amplifier integrated circuit may be electrically connected in parallel to the second connection end of the first resistor and to the first connection end of the second resistor, the inverting input connection of the operational amplifier integrated circuit may be electrically connected in parallel to the first connection end of the third resistor and to the source connection of the field-effect transistor, and the output connection of the operational amplifier integrated circuit may be electrically connected to the gate connection of the field-effect transistor, the drain connection of the field-effect transistor may be electrically connected to a cathode of the LED, an anode of the LED may be electrically connected to a cathode of the diode, the second connection end of the second resistor may be electrically connected to the to the second wire connection via the circuit ground, the second connection end of the third resistor may be electrically connected to the second wire connection via the circuit ground, and the first connection end of the capacitor may be electrically connected to the cathode of the diode and the second connection end of the capacitor may be electrically connected to the to the second wire connection via the circuit ground.

In various embodiments, the field-effect transistor may be a metal-oxide-semiconductor field-effect transistor.

Various embodiments may further include a printed circuit board configured to be electrically connected the diode, the voltage reference integrated circuit, the operational amplifier integrated circuit, the LED, the field-effect transistor, the first resistor, the second resistor, third resistor, and the capacitor, and the printed circuit board having the first wire connection and the second wire connection.

In various embodiments, the electrical current regulating circuit may be configured to use about 0.125 volts direct current or less.

Various embodiments may further include a surge protection circuit electrically connectable between the power supply and the electrical current regulating circuit.

Various embodiments may further include a surge protection circuit having a first connection electrically connectable to the power supply and a second connection electrically connected to the anode of the diode.

In various embodiments, the electrical current regulating circuit may include one of a plurality of electrical current regulating circuits, in which each of the plurality of the electrical current regulating circuits may be electrically connectable to the power supply.

In various embodiments, each of the plurality of the electrical current regulating circuits may be electrically connectable to one of a plurality of luminaires and configured to provide a current specified for operation of the at least one LED of the one of the plurality of luminaires, in which a first current specified for a first luminaire of the plurality of luminaires and a second current specified for a second luminaire of the plurality of luminaires are different.

In various embodiments, the plurality of electrical current regulating circuits may be integral to an aircraft escape slide.

In various embodiments, the power supply may include at least one of an aircraft on-board emergency battery and an integral aircraft escape slide-mounted battery.

Various disclosed embodiments may include apparatuses and methods for implementing an electrical current regulating circuit of a luminaire. In various embodiments, the luminaire includes at least one light emitting diode (LED), a first wire connection of the luminaire is electrically connectable to a positive power supply via a diode, and a second wire connection of the luminaire is electrically connected to a circuit ground of the luminaire and electrically connectable a power supply ground. In various embodiments, the electrical current regulating circuit of the luminaire may include a resistor having a first connection end and a second connection end, and an adjustable linear regulator having a voltage input connection, a voltage output connection, and an adjustment connection, in which the voltage input connection may be electrically connected to the first wire connection, the voltage output connection may be electrically connected to the first connection end of the resistor, and the adjustment connection may be connected in parallel to the second connection end of the resistor and to an anode of the LED.

In various embodiments, the second connection end of the resistor may be electrically connectable to the power supply ground via the LED, and a cathode of the LED may be electrically connected to the second wire connection of the luminaire.

In various embodiments, the electrical current regulating circuit may be integral to an aircraft escape slide.

Various disclosed embodiments may include apparatuses and methods for implementing an electrical current regulating circuit of a luminaire. In various embodiments, the luminaire includes at least one light emitting diode (LED), a first wire connection of the luminaire is electrically connectable to a positive power supply via a diode, and a second wire connection of the luminaire is electrically connected to a circuit ground of the luminaire and electrically connectable a power supply ground. In various embodiments, the electrical current regulating circuit of the luminaire may include a plurality of capacitors including a first capacitor, a second capacitor, a third capacitor, a fourth capacitor, a fifth capacitor, and a sixth capacitor, each of the plurality of capacitors having a first connection end and a second connection end, a plurality of resistors including a first resistor and a second resistor, each of the plurality of resistors having a first connection end and a second connection end, an inductor having a first connection end and a second connection end, and a switching regulator having a voltage input connection, a voltage bias input connection, an enable input connection, enable/disable power save mode connection, a control ground connection, a plurality of power ground connections, a voltage feedback connection, a voltage output connection, a first inductor connection, and a second inductor connection. In various embodiments, the voltage input connection may be electrically connected in parallel to a cathode of the diode, to the first connection end of each of the first capacitor and the second capacitor, and to the enable input connection, the voltage bias input connection may be electrically connected to the first connection end of the third capacitor, the first inductor connection may be electrically connected to the first connection end of the inductor, the second inductor connection may be electrically connected to the second connection end of the inductor, the voltage output connection may be electrically connected in parallel to the first connection end of each of the fourth capacitor, the fifth capacitor, and the sixth capacitor, and to an anode of the LED, the first connection end of each of the first resistor and the second resistor may be electrically connected in parallel to a cathode of the LED, the voltage feedback connection may be electrically connected to the cathode of the LED, and the second connection end of each of the first capacitor, the second capacitor, the third capacitor, the fourth capacitor, the fifth capacitor, and the sixth capacitor, the second connection end of each of the first resistor and the second resistor, the enable/disable power save mode connection, the control ground connection, and the plurality of power ground connections may be electrically connected in parallel to the second wire connection.

In various embodiments, the electrical current regulating circuit may be integral to an aircraft escape slide.

Various disclosed embodiments may include apparatuses and methods for implementing and powering a plurality of luminaires. In various embodiments, each luminaire of the plurality of luminaires includes at least one light emitting diode (LED) and each of a plurality of current regulators is electrically connected to one of the plurality of luminaires. Various embodiments may include receiving a voltage from a power source at an input of the plurality of luminaires, minimizing voltage consumption of each of the plurality of current regulators to ensure each of the plurality of current regulators receives sufficient voltage to power its connected luminaire, and providing a constant current by each of the plurality of current regulators sufficient to power the current regulator's connected luminaire.

In various embodiments, providing a constant current by each of the plurality of current regulators sufficient to power its connected luminaire may include providing a constant current by each of the plurality of current regulators sufficient to power its connected luminaire while current consumption of the connected luminaire varies.

Various embodiments may further include providing a test current load to the plurality of current regulators, measuring a summed current draw including a current draw of each of the plurality of current regulators that are operational, comparing the summed current draw to the test current load, and determining whether a luminaire is inoperative in response to the summed current draw being lower than the test current load.

In various embodiments, determining whether a luminaire is inoperative may include determining a number of the luminaires that are inoperative by an amount the summed current draw is lower than the test current load.

Various embodiments may further include providing an unambiguous indication that a luminaire is inoperative in response to determining that a luminaire is inoperative.

In various embodiments, the plurality of current regulators may include at least one selected from a group including a plurality of discrete linear current regulators, a plurality of integrated circuit linear current regulators, and a plurality of switching mode current regulators.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
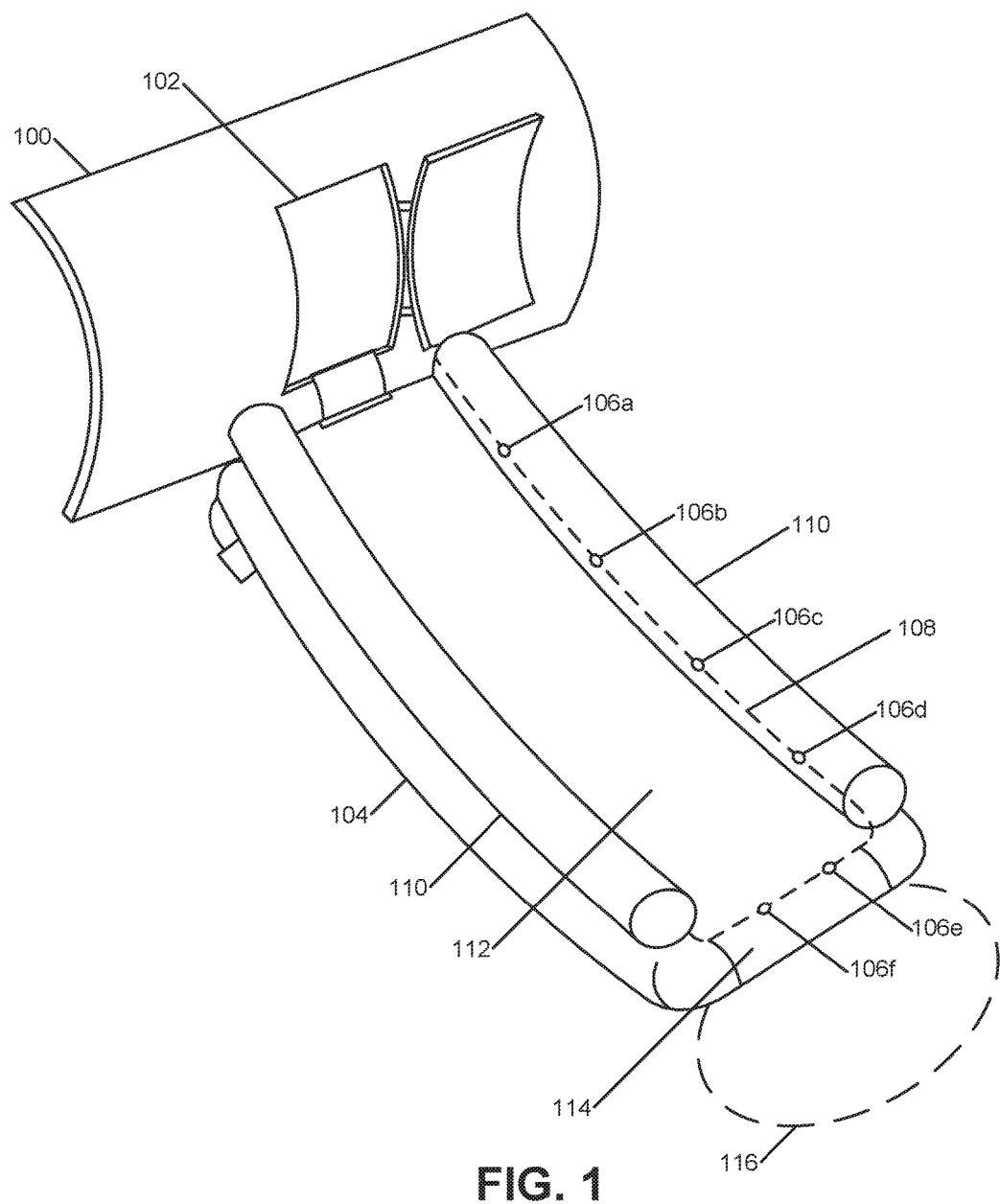
FIG. 1 is a perspective view diagram illustrating an aircraft escape slide lighting system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Light emitting diode (LED) based aircraft escape slide lighting systems can be subject to the harsh environment associated with installation on aircraft escape slides; including extreme pack compression loads (which can crush electronics or wires creating issues such as short circuits), repeated high variations in temperature and ambient pressure during flight operations over long periods of time, exposure to weather extremes including rain, snow and lightning, failures of emergency battery power systems, and the extreme physical dynamics associated with the deployment and use of aircraft escape slides. Unintended, unregulated, and unprotected inputs caused by these environmental conditions can result in individual LED lighting elements (hereinafter "luminaires") or an entire lighting system being improperly-powered; which can render these lighting systems inoperative or significantly compromised in the event of an emergency evacuation of an aircraft in low light conditions. Further, in large aircraft escape slide lighting systems with long lengths of relatively small gauge bus wire, luminaires at locations furthest from the input power connections can experience significant voltage drops that may result in reduced light output at these luminaires.

Various embodiments described herein may include methods, and systems and devices implementing such methods for electronic regulation and protection of luminaires within aircraft escape slide lighting systems. The apparatus and methods of the various embodiments may include constant current electronic regulation for each luminaire connected by electrical bus wires along a sliding lane and/or a ramp end of an aircraft escape slide. In various embodiments, constant current regulator circuits may be deployed at each luminaire with or without one or more centralized protection circuits at the power inputs to the aircraft escape slide lighting system. In various embodiments, constant current regulator circuits may be deployed in combination with one or more protection circuits (hereinafter, together, "enhanced constant current regulator circuit") for each luminaire. For brevity and ease of explanation, embodiments disclosed herein may be described with respect to the constant current regulator circuit. Unless otherwise noted, the descriptions of the constant current regulator circuit are also applicable to the enhanced constant current regulator circuit.

In various embodiments, the constant current regulator circuit may provide decentralized constant current regulation for aircraft escape slide lighting systems designed to minimize internal voltage drops to the LED(s), allowing the lighting system circuit to provide sufficient operating voltage to LEDs of luminaires that are at longer distances from a power source. The constant current regulator circuit may be configured to reduce or minimize the voltage necessary to operate the constant current regulator circuit and to increase or maximize available voltage at each luminaire along the bus wire. The constant current regulator circuit may also accommodate cases where the voltage is not enough to provide an LED with its required forward voltage (Vf) for its proper operation. These features of the constant current regulator circuit aid to provide constant light intensity for a given luminaire on an aircraft escape slide lighting system, regardless of variations in voltage provided by an aircraft on-board emergency battery and/or an integral aircraft escape slide-mounted battery pack. These features of a decentralized and distributed constant current regulation system provide for greater aircraft escape slide lighting system reliability as failure of a single constant current regulator circuit only affects the LED(s) of a single luminaire; while in the current aircraft escape slide lighting systems, failure of the centralized regulator could cause the entire lighting system to fail.

Further, the constant current regulator circuit in conjunction with a centralized protection circuit and/or the enhanced constant current regulator circuit with integral protection circuit(s) may provide surge protection from unintended high power inputs and/or protection from reversed polarity inputs.

The decentralized design of an aircraft escape slide lighting system having constant current regulator circuits for each luminaire may provide advantages over a centralized constant current regulated aircraft escape slide lighting system or a centralized voltage regulated aircraft escape slide lighting system. Advantages may be realized in testing the operational state of components of an aircraft escape slide lighting system, particularly when the aircraft escape slide is installed in an aircraft and packed in an undeployed, stand-by, or ready-to-be-deployed configuration. A centralized constant current regulated aircraft escape slide lighting system cannot be tested to detect if individual luminaires are inoperative. A centralized constant current regulated aircraft escape slide lighting system provides constant current to the entire aircraft escape slide lighting system. If one or more luminaires become inoperative and no longer draw their designed current level, the centralized constant current regulator will simply provide more current to the remaining luminaires in order to maintain the designed constant current output to the entire aircraft escape slide lighting system circuit. In testing a centralized voltage regulated aircraft escape slide lighting system it is difficult to determine actual current consumption by the lighting system circuit because the current consumption will increase during the heating ramp up of the LED junction when the LED is turned on, and will vary according to changes in ambient temperature conditions. Both of these conditions can affect GO/NO-GO test readings, which may be required for dispatch of an aircraft for flight. A centralized linear-type voltage regulator has the added disadvantages of heat dissipation and the necessary incorporation of large heat sink provisions. A centralized switching mode voltage regulator does not have the heat sink issue, but variations in the input voltage cause inverse variations to the input current, making the establishment of unambiguous acceptance test limits very difficult—particularly if the power supply has a relatively high degree of variability.

Testing an aircraft escape slide lighting system may involve the lighting system circuit to be separately and momentarily powered by test equipment, which may include a regulated power supply providing a constant direct current (DC) voltage, a voltmeter for confirming input voltage, and an ammeter for verifying that the luminaires are operating at a current level sufficient to meet established design and regulatory requirements. To fully verify the readiness of an aircraft escape slide lighting system, the test should (a) confirm that all LEDs (luminaires) are operating, (b) confirm the total current designed to operate all of the LEDs at a specific input voltage can verified, and (c) provide unambiguous and consistent verification that all luminaires are operating without regard variations in local test conditions (e.g., ambient temperature). The decentralized design of an aircraft escape slide lighting systems having constant current regulator circuits for each luminaire may address each of these requirements and may overcome the disadvantages of existing LED-based aircraft escape slide lighting systems with respect to testing. The individual constant current regulator circuit powering a luminaire may fail to provide its designed level of current if the LED(s) within the luminaire are inoperative, which may lower the overall current of the lighting system circuit read by test equipment as a direct function of the number of LEDs that are inoperative. Therefore, the testing results may indicate a number of inoperative LEDs of the aircraft escape slide lighting system. Testing the aircraft escape slide lighting system may provide an unambiguous indication that all of the LEDs of the lighting system circuit are operational when all of the LEDs and their respective constant current regulators operate at their design current. Further, the constant current regulators may provide constant current under the normally varying current consumption of LEDs as they warm up during the first few seconds of operation, or as their operating current is affected by changes in ambient temperature.

The individual constant current regulator circuits for each luminaire in the decentralized design aircraft escape slide lighting system may also provide advantages in manufacturing. Existing centralized design aircraft escape slide lighting systems include a voltage conditioning resistor in series with each LED to assist in regulation of the input voltage to each LED. Each LED is designed to operate at a specific, design current and voltage level, and therefore a specified light output at specific locations along the bus wires. The conditioning resistors are selected to condition the input voltage to the LEDs to operate at a specific current corresponding to a desired light output. To meet this requirement, LEDs and conditioning resistors are selected on the basis of three variables: a) the unique forward voltage (Vf) of each individual LED device, b) the intended operating current (light intensity) at each specific location of the luminaires on each different aircraft escape slide lighting system, and c) the voltage level available at each luminaire at each location along a bus wire for each different aircraft escape slide lighting system (a function of cumulative voltage drops along the bus wire). Aircraft escape slide lighting systems can vary in length and the number of luminaires. So, the process required to match LEDs with specific resistors for each unique position on different aircraft escape slide lighting systems, and the resulting component configurations for each unique luminaire are applicable for only specific types of aircraft escape slide lighting systems. The numbers of operations required for the process of configuring and manufacturing aircraft escape slide lighting systems, while high, is not sufficient to justify the high cost of automation for this process and thus must be accomplished by highly skilled hand assembly and soldering operators.

Replacing the conditioning resistor for each LED with a constant current regulator in each luminaire may significantly reduce the direct labor and required skill level in the manufacturing process for aircraft escape slide lighting systems. Instead, a machine-preassembled constant current regulator printed circuit board, having LED(s) and a constant current regulator circuit set to operate at a specified current (and light intensity), may be connected at any position on the bus wire of an aircraft escape slide lighting harness corresponding to that specific operating current requirement. Direct labor and overhead savings may be realized by reducing training and skill requirements of operators to solder comparatively small surface mount devices to printed circuit boards, by allowing the use of lesser skilled operators who only solder or weld the bus wires to solder pads on the constant current regulator printed circuit boards. Further, automation or semi-automation of aircraft escape slide lighting fabrication process, which is not now possible with the centralized regulator systems, may be viable as a result of significantly simplifying the luminaire assembly process to attachment of the constant current regulator printed circuit boards by requiring only the soldering or welding the bus wire to the constant current regulator printed circuit boards. This may allow for automated, mass production of a small number of unique constant current regulator printed circuit board designs to cover all positions of the various aircraft escape slide lighting systems, irrespective of aircraft type, escape slide type, etc.

Indirect labor and overhead savings may be realized by reducing the large number of different discreet parts that must be purchased, received, inspected, stocked, and handled, including printed circuit boards, LEDs, and conditioning resistors having a wide range of resistor values. A small set of unique configurations of the constant current regulator printed circuit boards may be used to fabricate a large proportion, up to all, of the aircraft escape slide lighting systems required for the entire global fleet of transport category large and regional jet aircraft requiring escape slides. The number of unique configurations of the constant current regulator printed circuit boards will be relatively small (e.g., approximately twenty) compared to the thousands of combinations of luminaire configurations for a range of aircraft escape slide lighting systems with centralized regulation systems that now require a labor intensive, multi-step testing, kitting and assembly process requiring many hundreds of different components.

Savings in maintenance of aircraft escape slide lighting systems may also be realized from a reduced number of replacement parts. It is necessary for aircraft escape slide manufacturers, maintenance/overhaul facilities, and airline operators to maintain a stock of replacement luminaires for field repairs. Similar to normal manufacturing operations for new aircraft escape slide lighting systems, the manufacture of replacement luminaires for field repairs requires the same testing, hand assembly, and identification for each unique position on each unique escape slide lighting system. Depending on the number of different aircraft and aircraft escape slide lighting systems being maintained or operated, hundreds of unique replacement luminaires may be required to be purchased and maintained by each field maintenance facility to handle unexpected repair requirements. Replacing these hundreds of unique replacement luminaires with a small number of luminaires using the constant current regulator printed circuit boards greatly reduces the cost of replacement luminaire inventory along with the number and diversity of parts from hundreds to fewer than twenty in most cases.

FIG. 1 illustrates an aircraft escape slide lighting system suitable for implementing various embodiments. An aircraft 100 may include any number of aircraft escape slide exits 102, including entrance/exit doors used for loading and unloading passengers and objects during standard and emergency procedures, emergency exit hatches used for evacuating passengers from an aircraft during emergency situations, and aircraft escape slide exit hatches used for deploying aircraft escape slides 104 during emergency evacuations. The aircraft 100 may be equipped with any number aircraft escape slides 104 that may be deployed at any of the aircraft escape slide exits 102. The aircraft escape slides 104 may be attached to the aircraft 100 at the aircraft escape slide exits 102 and deployed into an unpacked/deployed configuration by inflating the aircraft escape slides 104 with a gas to unpack and unfurl the aircraft escape slides 104 from a packed/undeployed configuration. The aircraft escape slides 104 may be configured to provide means for conveying passengers and crew of the aircraft from the aircraft escape slide exits 102 to ground or water level below the aircraft escape slide exits 102. In various embodiments, the aircraft escape slides 104 may be configured to remain attached to the aircraft 100 or detached from the aircraft 100, for use as a floatation device (e.g., an inflatable raft) by the passengers and crew, after deployment of the aircraft escape slides 104.

Aircraft escape slides 104 may be constructed with an aircraft escape slide lighting system including any number of luminaires 106a-106f that may be configured to provide light to surfaces and/or surrounding areas of the aircraft escape slides 104. As discussed further herein, various embodiments of the luminaires 106a-106f may include any number and combination of LEDs, constant current regulator circuits, and/or protection circuits. The luminaires 106a-106f may be placed on, under, and/or through surfaces of the aircraft escape slides 104. Placement of the luminaires 106a-106f may provide lighting patterns that illuminate surfaces and/or surrounding areas of the aircraft escape slides 104, and/or that provide visual guidance indicators for use and/or visual spotting of the aircraft escape slides 104. In various embodiments, the placement, lighting pattern, amount of light, and/or color/frequency of light for each luminaire 106a-106f may vary and be configured to comply with rules and regulations of governing bodies relating to aircraft escape slide lighting systems. Typically, such rules and regulations may include locations of luminaires 106a-106d along the sides of the aircraft escape slide 104 to illuminate the sliding surface 112 and locations of luminaires 106e, 106f at an exit-end 114 of the aircraft escape slide 104 to illuminate an area 116 where an evacuee will first make contact with the ground upon exiting the aircraft escape slide 104.

The luminaires 106a-106f may be electrically connected to each other and to a power source, such as an aircraft on-board emergency battery and/or an integral aircraft escape slide-mounted battery pack, by a power bus 108. In various embodiments, the power bus 108 may be configured to electrically connect the luminaires 106a-106f individually and/or in groups, in parallel and/or serially to the power source. The power bus 108 may include any number or electrically conductive wires of any combination of materials and/or gauges.

In an example embodiment, luminaires 106a-106f may be disposed along at least one side of an aircraft escape slide 104. The luminaires 106a-106d may be disposed along an integral inflatable rail 110 of the aircraft escape slide 104, such that the luminaires 106a-106d provide a light pattern configured to illuminate a sliding surface 112 of the aircraft escape slide 104. The luminaires 106e, 106f may be disposed at the exit-end 114 of the aircraft escape slide 104, such that the luminaires 106e, 106f provide a light pattern to illuminate the area 116 where an aircraft evacuee would first make contact with the ground.

Figure 2A:
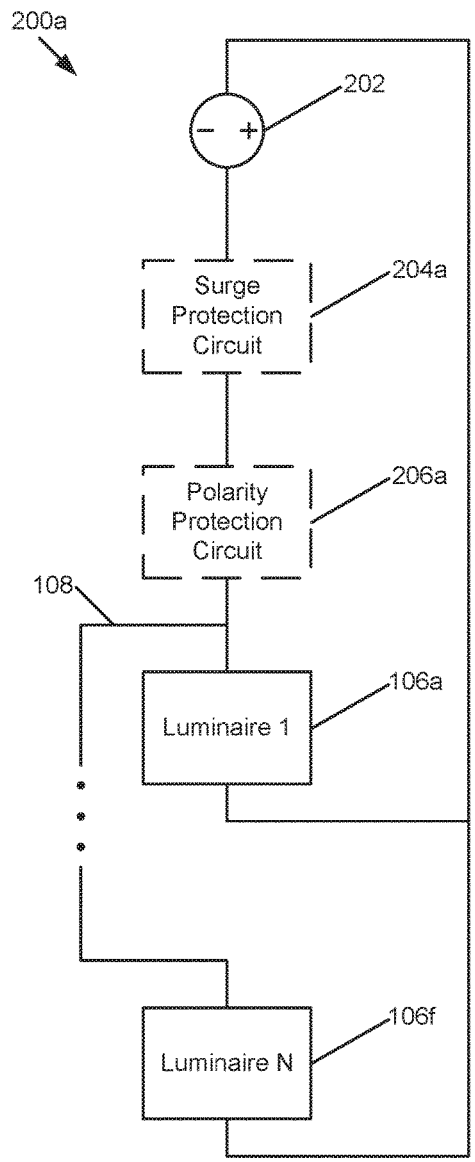
FIGS. 2A and 2B are component block diagrams illustrating examples of aircraft escape slide lighting systems suitable for implementing various embodiments.
Figure 2B:
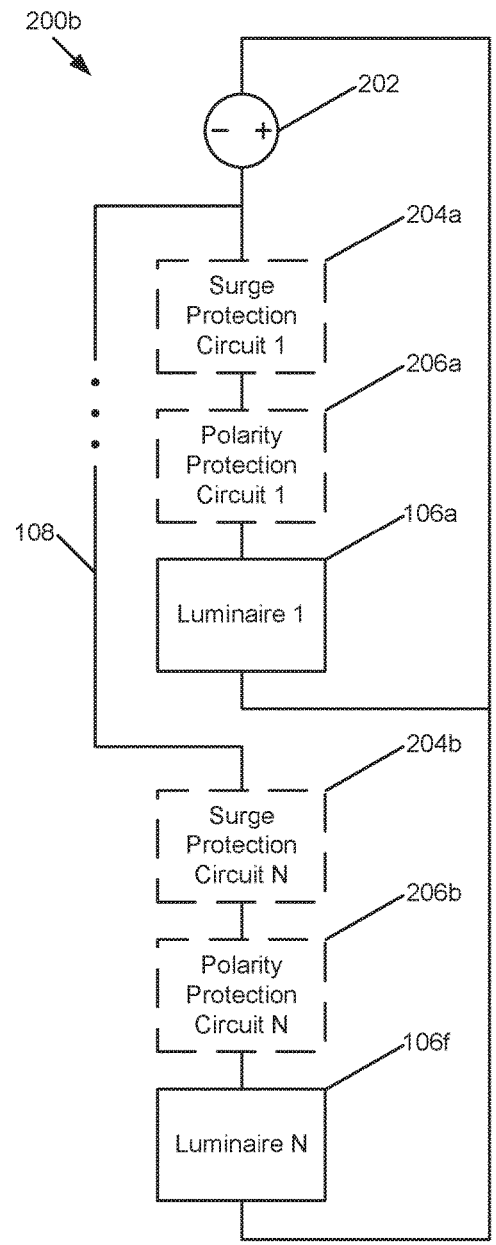

FIGS. 2A and 2B illustrate aircraft escape slide lighting systems 200a, 200b suitable for implementing various embodiments. The escape slide lighting systems 200a, 200b may include any number "N" of luminaires, e.g., luminaire 1 106a to luminaire N 106f, connected in parallel via a power bus 108. The luminaires 106a-106f may be electrically connected in parallel to a power source 202 via the power bus 108. The power source 202 may include any combination of an aircraft on-board emergency battery and/or an aircraft escape slide-mounted battery pack.

The example illustrated in FIG. 2A of the aircraft escape slide lighting systems 200a may be configured with any combination of protection circuits, including a surge protection circuit 204a and/or a polarity protection circuit 206a, configured to provide protection for the luminaires 106a-106f from unintended high input powers and/or protection from reversed polarity inputs to the luminaires 106a-106f. Each protection circuit 204a, 206a may be a centralized protection circuit configured to provide protection to multiple luminaires 106a-106f, including to all of the luminaires 106a-106f connected to the power bus 108. A protection circuit 204a, 206a may be electrically connected between the power source 202 and the luminaires 106a-106f via the power bus 108. The protection circuit 204a, 206a may be electrically connected with the power source 202 and with the parallel connected luminaires 106a-106f. In various embodiments, multiple protection circuits 204a, 206a may be connected with each other between the power source 202 and the luminaires 106a-106f. In various embodiments, one of the multiple protection circuits 204a, 206a may be connected between the power source 202 and another of the multiple protection circuits 204a, 206a which may be electrically connected with the parallel connected luminaires 106a-106f.

The example illustrated in FIG. 2B of the aircraft escape slide lighting systems 200b may be configured with any combination of protection circuits, including a surge protection circuits 204a and 204b and/or a polarity protection circuit 206a and 206b, configured to provide protection for the luminaires 106a-106f from unintended high input powers and/or protection from reversed polarity inputs to the luminaires 106a-106f. Each protection circuit 204a, 204b, 206a, 206b may be a distributed protection circuit configured to provide protection to at least one luminaire 106a-106f, including to a single luminaire 106a-106f, connected to the power bus 108. The aircraft escape slide lighting systems 200b may include any number of each type of the protection circuits 204a, 204b, 206a, 206b, including the number "N" of each type of the protection circuits 204a, 204b, 206a, 206b (e.g., surge protection circuit 1 204a to surge protection circuit N 204b and/or polarity protection circuit 1 206a to polarity protection circuit N 206b). A protection circuit 204a, 204b, 206a, 206b may be electrically connected between the power source 202 and a luminaire 106a-106f via the power bus 108. For example, the protection circuit 204a, 206a may be electrically connected between the power source 202 and the luminaire 106a. Further, the protection circuit 204b, 206b may be electrically connected between the power source 202 and the luminaire 106f. In various embodiments, multiple protection circuits 204a, 204b, 206a, 206b may be connected between the power source 202 and the luminaire 106a-106f. In various embodiments, one of the multiple protection circuits 204a, 204b, 206a, 206b may be connected between the power source 202 and another of the multiple protection circuits 204a, 204b, 206a, 206b, which may be connected with a luminaire 106a-106f.

The forgoing examples of the aircraft escape slide lighting systems 200a, 200b are not meant to limit the claims, the number of luminaires 106a-106f or protection circuits 204a, 204b, 206a, 206b, or the relationships of luminaires 106a-106f and protection circuits 204a, 204b, 206a, 206b. For example, in various embodiments, an aircraft escape slide lighting system 200a, 200b may include any combination of a surge protection circuit 204a, 204b and/or a polarity protection circuit 206a, 206b as centralized protection circuits and/or distributed protection circuits. In various embodiments, a surge protection circuit 204a, 204b and a polarity protection circuit 206a, 206b may be separate protection circuits 204a, 204b, 206a, 206b or a protection circuit incorporating a surge protection circuit 204a, 204b and a polarity protection circuit 206a, 206b. In various embodiments, any combination of a surge protection circuit 204a, 204b and/or a polarity protection circuit 206a, 206b, may be included in a luminaire 106a-106f.

Figure 3:
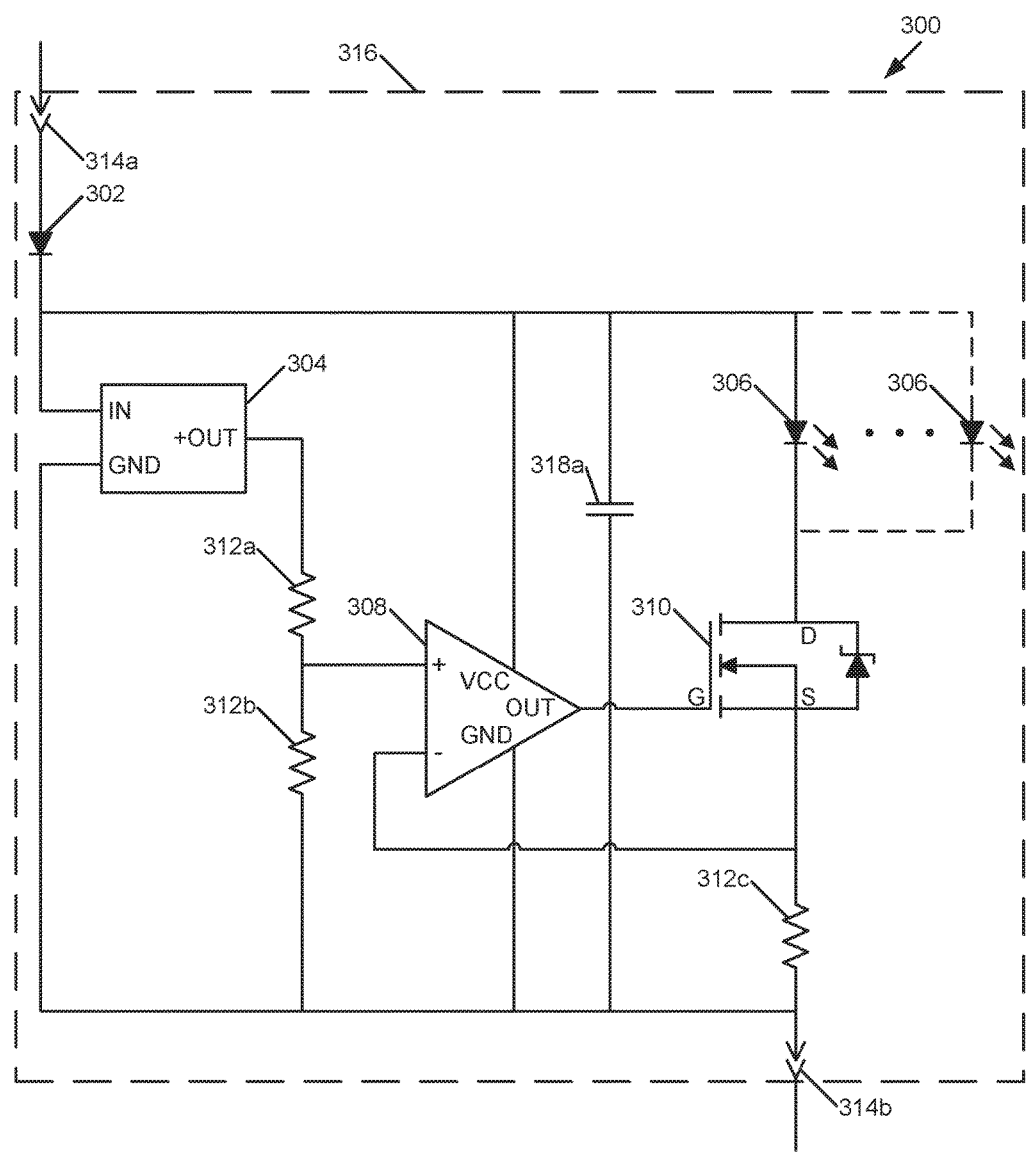
FIG. 3 is a circuit diagram illustrating an example luminaire suitable for implementing various embodiments.

FIG. 3 illustrates an example luminaire 300 suitable for implementing various embodiments. Each luminaire 106a-106f in FIGS. 1 and 2 may be implemented as an instance of the luminaire 300. The luminaire 300 may include various components, including a reverse polarity protective diode 302, a voltage reference 304, an LED 306, an operational amplifier 308, a field effect transistor 310, a resistor 312a, 312b, 312c, an input power connection 314a, 314b, and a capacitor 318a. In various embodiments, the components of the luminaire 300 may be electrically connected to a printed circuit board 316 having electrical conductive paths configured to electrically connect the components to each other in a designated manner, as described further herein.

The luminaire 300 may include input power connections 314a, 314b to the power bus 108, such as a positive input power connection 314a and a negative (ground) input power connection 314b, configured to electrically connect the luminaire 300 to the rest of the aircraft escape slide lighting systems 200a, 200b. The input power connections 314a, 314b may be configured to electrically connect the luminaire 300 to the power bus 108 of the aircraft escape slide lighting systems 200a, 200b. The input power connections 314a, 314b may be configured to electrically connect the luminaire 300 to the power bus 108 to allow current to flow to the luminaire 300. The input power connections 314a, 314b may electrically connect the luminaire 300 to the power source 202. In various embodiments, the input power connections 314a, 314b may electrically connect the luminaire 300 to the power source 202 via the power bus 108 and/or via any combination of centralized and/or decentralized protection circuits 204a, 204b, 206a, 206b. In various embodiments, a decentralized protection circuit 204a, 204b, 206a, 206b may be a component of the luminaire 300 and electrically connected between the input power connections 314a, 314b and any combination of the other components of the luminaire 300. In various embodiments, a decentralized protection circuit 204a, 204b, 206a, 206b may be electrically connected to the printed circuit board 316. The input power connections 314a, 314b may be configured to electrically connect the luminaire 300 to the power bus 108 to allow current to flow from the luminaire 300. The luminaire 300 may also include a circuit ground that may be electrically connected to the negative (ground) input power connection 314b. In various embodiments, the circuit ground may be configured to connect various components of the luminaire 300 to the negative (ground) input power connection 314b.

A reverse polarity protective diode 302 may be electrically connected to the positive input power connection 314a and may be configured to control the direction of the flow of current into the luminaire 300. The reverse polarity protective diode 302 may include an anode and a cathode. The anode of the reverse polarity protective diode 302 may be electrically connected to the positive input power connection 314a. The reverse polarity protective diode 302 may configured to allow the flow of current from the positive input power connection 314a to any combination of other components of the luminaire 300. The cathode of the reverse polarity protective diode 302 may be electrically connected to any combination of other components of the luminaire 300. The reverse polarity protective diode 302 may configured to impede, including prevent, the flow of current from any combination of other components of the luminaire 300. In various embodiments, the cathode of the reverse polarity protective diode 302 may be directly electrically connected to the voltage reference 304, the LED 306, and/or the operational amplifier 308.

The voltage reference 304 may be configured to produce a constant voltage, regardless of power supply variations, temperature changes, and/or circuit loading. In various embodiments, the voltage reference 304 may be implemented as a voltage reference integrated circuit 304. The voltage reference integrated circuit 304 may include a number of input/output connections, including a positive-power connection ("IN"), a negative-power connection ("GND"), and a voltage-regulated positive-power connection ("+OUT"). The positive-power connection "IN" may be electrically connected to the cathode of the reverse polarity protective diode 302 and the negative-power connection "GND" may be electrically connected to the negative (ground) input power connection 314b. The voltage reference integrated circuit 304 may be configured to sense an input voltage and convert the input voltage to a first designated voltage level. In various embodiments, the voltage reference integrated circuit 304 may include various components configured to sense and increase and/or decrease the input voltage to convert the input voltage to the first designated voltage level. In various embodiments, the first designated voltage level may be designated based on configurations of other components of the luminaire 300, such as an LED 306, the operational amplifier 308, and/or a resistor 312a, 312b, 312c, which may be configured as a voltage dividing circuit resistor 312a, 312b. In other words, the first designated voltage level may be configured so that any configuration and combination of the components of the luminaire may be operable so that the luminaire 300 functions. The voltage-regulated positive power output connection "+OUT" of the voltage reference integrated circuit 304 may be electrically connected to any combination of other components of the luminaire 300, such as to a voltage dividing circuit resistor 312a and/or the operational amplifier 308. The voltage reference integrated circuit 304 may be configured to provide the first designated voltage level as the reference constant voltage via the voltage-regulated positive power output connection "+OUT".

The operational amplifier 308 may be configured to produce an amplified voltage relative to an input voltage. In various embodiments, the operational amplifier 308 may be implemented as an operational amplifier integrated circuit 308. The operational amplifier integrated circuit 308 may include a number of electrical connections, including a positive-power input connection ("VCC"), a negative-power input connection ("GND"), a non-inverting positive input connection ("+"), an inverting negative input connection ("−"), and an output connection ("OUT"). The positive-power input connection "VCC" may be electrically connected to the cathode of the reverse polarity protection diode 302 and the negative-power input connection "GND" may be electrically connected to the negative (ground) input power connection 314b.

In various embodiments, the non-inverting positive input connection "+" of the operational amplifier 308 may be electrically connected to the voltage-regulated positive-power connection "+OUT" of the voltage-regulated circuit 304 via the voltage dividing circuit resistors 312a, 312b. A first connection end of the voltage dividing circuit resistor 312a may be electrically connected to the voltage-regulated positive-power connection "+OUT" of the voltage-regulated circuit 304, and a second connection end of the voltage dividing circuit resistor 312a may be electrically connected in parallel to the non-inverting positive input connection "+" of the operational amplifier 308 and a first connection end of the voltage dividing circuit resistor 312b. A second connection end of the voltage dividing circuit resistor 312b may be connected to the negative (ground) input power connection 314b. In various embodiments, the voltage dividing circuit resistors 312a, 312b may be configured to reduce the constant voltage output by the voltage reference integrated circuit 304 to a second designated voltage level. In various embodiments, the second designated voltage level may be designated based on configurations of other components of the luminaire 300, such as an LED 306, the voltage reference integrated circuit 304, and/or the operational amplifier integrated circuit 308. In other words, the second designated voltage level may be configured so that any configuration and combination of the components of the luminaire may be operable so that the luminaire 300 functions.

The inverting negative input connection "−" of the operational amplifier integrated circuit 308 may be electrically connected to a negative feedback circuit including a field effect transistor 310, as described further herein, and the resistor 312c. The inverting negative input connection "−" may be electrically connected in parallel to a first negative terminal of the field effect transistor 310 and a first connection end of the resistor 312c, which may also have a second connection end electrically connected to the negative (ground) input power connection 314b. In various embodiments, the negative feedback circuit, including the field effect transistor 310 and the resistor 312c, may be configured to reduce the voltage difference between the non-inverting positive input connection "+" of the operational amplifier integrated circuit 308 and the inverting negative input connection "−" of the operational amplifier integrated circuit 308 by providing a portion of an output of the operational amplifier integrated circuit 308 to the inverting negative input connection "−". In various embodiments, the negative feedback circuit, including the field effect transistor 310 and the resistor 312c, may be configured the provide a voltage at the inverting negative input connection "−" of the operational amplifier integrated circuit 308 equal to the voltage at the non-inverting positive input connection "+" when the operational amplifier integrated circuit 308 is in equilibrium. In various embodiments, the operational amplifier integrated circuit 308 connected to the negative feedback circuit may be a non-inverting operational amplifier integrated circuit 308.

The operational amplifier integrated circuit 308 may be configured to amplify the difference in the voltages between the non-inverting positive input connection "+" of the operational amplifier integrated circuit 308 and the inverting negative input connection "−" of the operational amplifier integrated circuit 308. The operational amplifier integrated circuit 308 may be configured to output an amplified voltage at the output connection "OUT" of the, which may be electrically connected to the field effect transistor 310, as described further herein.

The field effect transistor 310 may be configured to control a flow of current between an LED 306 and the negative (ground) input power connection 314b through the resistor 312c. In various embodiments, the field effect transistor 310 may include various types, such as a metal oxide semi-conductor field effect transistor ("MOSFET") and a bipolar junction transistor ("BJT"). The field effect transistor 310 may include number of input/output connections, including a gate connection ("G"), a drain connection ("D"), and a source connection ("S"). In various embodiments, the field effect transistor 310 may include a metal oxide semi-conductor field-effect transistor (MOSFET), such as a power MOSFET. The gate connection "G" of the field effect transistor 310 may be electrically connected to the output connection "OUT" of the operational amplifier integrated circuit 308. The gate connection "G" may receive the output of the operational amplifier integrated circuit 308 and the field effect transistor 310 may modulate the conductivity of a channel, electrically connecting the drain connection "D" and the source connection "S", in response to the voltage level of the output of the operational amplifier integrated circuit 308. Modulating the conductivity may control the amount of current that flows through the field effect transistor 310 between the drain connection "D" and the source connection "S". The drain connection "D" may be electrically connected to an output of an LED 306, as described further herein, and configured to input received current to the field effect transistor 310. The source connection "S" may be electrically connected to the inverting negative input connection "−" of the operational amplifier integrated circuit 308 and to the first connection end of the resistor 312c. In various embodiments, the source connection "S" may be electrically connected to the negative (ground) input power connection 314b via the resistor 312c. The source connection "S" of the field effect transistor 310 may be configured to output the current conducted by the field effect transistor 310.

An LED 306 may be configured to produce light in response to a designated current applied to the LED 306. In various embodiments, the luminaire may include any number of LEDs 306 connected in parallel. An LED 306 may include an anode and a cathode. The anode of the LED 306 may be electrically connected to the positive input power connection 314a. In various embodiments, the anode of the LED 306 may be electrically connected to the positive input power connection 314a via the reverse polarity protective diode 302. The cathode of the LED 306 may be electrically connected to the negative (ground) input power connection 314b. In various embodiments, the cathode of the LED 306 may be electrically connected to the negative (ground) input power connection 314b via the drain connection "D" of the field effect transistor 310 and the resistor 312c. In various embodiments in which multiple LEDs 306 are connected in parallel, the anodes of the LEDs 306 may be electrically connected in parallel to a first electrically common node electrically connected to the positive input power connection 314a, and the cathodes of the LEDs 306 may be electrically connected in parallel to a second electrically common node electrically connected to the negative (ground) input power connection 314b via the drain connection "D" of the field effect transistor 310 and the resistor 312c. The LED 306 may allow current to pass through the LED 306, between the anode and the cathode, energizing electrons that release photon energy as they drop from the energized level to a lower energy level. Current may exit the LED 306 via the cathode and flow to the drain connection "D" of the field effect transistor 310.

A capacitor 318a may be configured to smooth and/or filter current to the LED 306, and/or decouple the LED 306 in response to potentially damaging current. In various embodiments, a first connection end of the capacitor 318a may be electrically connected between the cathode of the reverse polarity protective diode 302 and the anode of the LED 306. A second connection end of the capacitor 318a may be electrically connected to the negative (ground) input power connection 314b. In various embodiments, the capacitor 318a may be configured smooth and/or filter current received via the reverse polarity protective diode 302 prior to being received by the LED 306. In such configurations, the capacitor 318a may prevent flickering and/or variation in the lighting output of the LED 306. In various embodiments, the capacitor 318a may be configured or decouple the LED 306 in response to potentially damaging current being received from the reverse polarity protective diode 302 prior to being received by the LED 306. In such configurations, the capacitor 318a may shunt potentially damaging levels of current to the negative (ground) input power connection 314b prior to the potentially damaging levels of current arriving at the LED 306.

In various embodiments, the reverse polarity protecting diode 302, the voltage reference integrated circuit 304, the operational amplifier integrated circuit 308, the field effect transistor 310, the voltage dividing circuit resistors 312a, 312b, the resistor 312c, and the capacitor 318a may make up an electrical current regulating circuit, also referred to as a linear current regulator, that may be configured to regulate a current provided to the luminaire 300 at the input power connections 314a, 314b. The electrical current regulating circuit may be configured as a discrete linear current regulator having any combination of discrete and/or integrated components. The electrical current regulating circuit may be configured as an integrated circuit linear current regulator having its components electrically connected to the printed circuit board 316. The electrical current regulating circuit may regulate the current provided to the luminaire 300 to provide a constant current to the LED 306 sufficient for the LED 306 to be operational to produce a designated light level. The constant current level provided to the LED 306 may include the designated design operating currents of the LED 306. In various embodiments, the constant current level may include a multiple of the designated design operating currents of the LED 306 equal to the designated design operating currents multiplied by a number of LEDs 306 connected in parallel. In various embodiments, the designated current of the LED 306 may vary based on the intended use and/or construction of the LED 306, including the amount of light, color of light, illumination target area, such as sliding surface 112 and/or area 116, and/or location on the aircraft escape slide lighting systems 200a, 200b (e.g., distance from the power source 202). In various embodiments, the current provided to the luminaire 300 may be regulated by the electrical current regulating circuit regardless of power supply variations, temperature changes, and/or circuit loading. In various embodiments, the electrical current regulating circuit may be configured to minimize voltage consumption to ensure each of multiple electrical current regulating circuits receive sufficient voltage to power an associated luminaire 106a-106f, regardless of power supply variations, temperature changes, circuit loading, and/or current draw of the associated luminaire 106a-106f. In various embodiments, the electrical current regulating circuit may be configured to use about 0.125 volts direct current (DC) or less.

Figure 4:
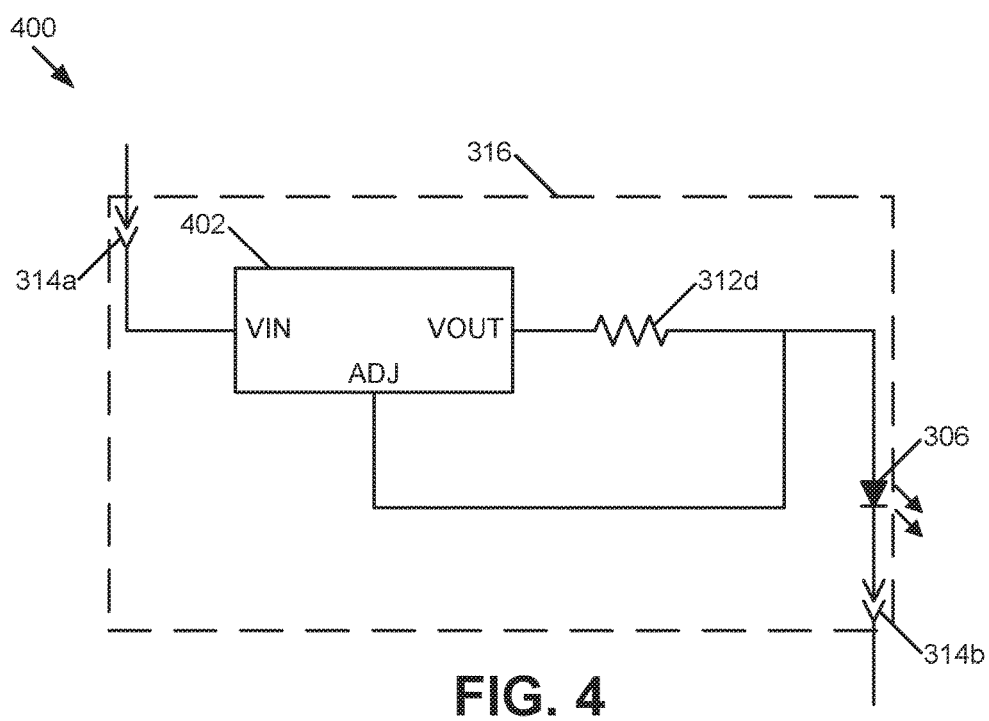
FIG. 4 is a circuit diagram illustrating an example luminaire suitable for implementing various embodiments.

FIG. 4 illustrates an example luminaire 400 suitable for implementing various embodiments. Each luminaire 106a-106f in FIGS. 1 and 2 may be implemented as an instance of the luminaire 400. The luminaire 400 may include various components, including a linear voltage regulator 402, an LED 306, a resistor 312d, and an input power connection 314a, 314b. In various embodiments, the components of the luminaire 400 may be electrically connected to a printed circuit board 316 having electrical conduit paths configured to electrically connect the components to each other in a designated manner, as described further herein.

The luminaire 400 may include input power connections 314a, 314b configured to electrically connect the luminaire 400 to the rest of the aircraft escape slide lighting systems 200a, 200b, as described herein with reference to FIG. 3.

The linear voltage regulator 402 may be configured to regulate a current provided to the luminaire 400 at the positive input power connection 314a by maintaining a constant voltage at an output of the voltage regulator 402. The voltage regulator 402 may include a voltage input connection ("VIN"), a voltage output connection ("VOUT"), and an adjustment connection ("ADJ"). The voltage input connection "VIN" may be electrically connected to the positive input power connection 314a. The voltage output connection "VOUT" may be electrically connected to the negative (ground) input power connection 314b. In various embodiments, the voltage output connection "VOUT" may be electrically connected to the negative (ground) input power connection 314b via the resistor 312d and/or the LED 306. The voltage output connection "VOUT" may be electrically connected to a first connection end of the resistor 312d. The adjustment connection "ADJ" may be electrically connected to a second connection end of the resistor 312d. In various embodiments, the adjustment connection "ADJ" may be electrically connected to the voltage output connection "VOUT" via the resistor 312d.

The LED 306 may be electrically connected by the anode to the voltage output connection "VOUT" of the linear voltage regulator 402 and by the cathode to the negative (ground) input power connection 314b. In various embodiments, the LED 306 may be electrically connected to the voltage output connection "VOUT" via the resistor 312d. The LED 306 may be configured as described further herein with reference to FIG. 3.

In various embodiments, the linear voltage regulator 402 and the resistor 312d may make up an electrical current regulating circuit that may be configured to regulate a current provide to the luminaire 400 at the positive input power connection 314a. The electrical current regulating circuit may be configured as a discrete linear current regulator having any combination of discrete and/or integrated components. The electrical current regulating circuit may be configured as an integrated circuit linear current regulator having its components electrically connected to the printed circuit board 316. The electrical current regulating circuit may regulate the current provide to the luminaire 400 to provide a constant current to the LED 306 sufficient for the LED 306 to be operational to produce a designated light level, as discussed with reference to FIG. 3. The linear voltage regulator 402 may include various components that can manipulate a resistance of the linear voltage regulator 402 to control the voltage at the voltage output connection "VOUT". The linear voltage regulator 402 may be configured to provide the constant current as a function of the voltage at the voltage output connection "VOUT". The linear voltage regulator 402 may sense the voltage at the voltage output connection "VOUT" as an input at the adjustment Connection "ADJ". In various embodiments, the linear voltage regulator 402 may sense the voltage at the second connection end of the resistor 312d as an input at the adjustment connection "ADJ". The voltage at the second connection end of the resistor 312d may be a function of the voltage at the voltage output connection "VOUT" and the resistance of the resistor 312d. The linear voltage regulator 402 may adjust the voltage of the voltage output connection "VOUT" based on a voltage sensed at the voltage input connection "VIN" and the voltage sensed at the adjustment connection "ADJ". The linear voltage regulator 402 may produce a voltage at the voltage output connection "VOUT" that corresponds with the constant current to provide, directly or via the resistor 312d, to the LED 306 sufficient for the LED 306 to be operational to produce a designated light level. The constant current may include the designated design operating current of the LED 306. In various embodiments, the current provided to the luminaire 400 may be regulated by the electrical current regulating circuit regardless of power supply variations, temperature changes, and/or circuit loading.

Figure 5:
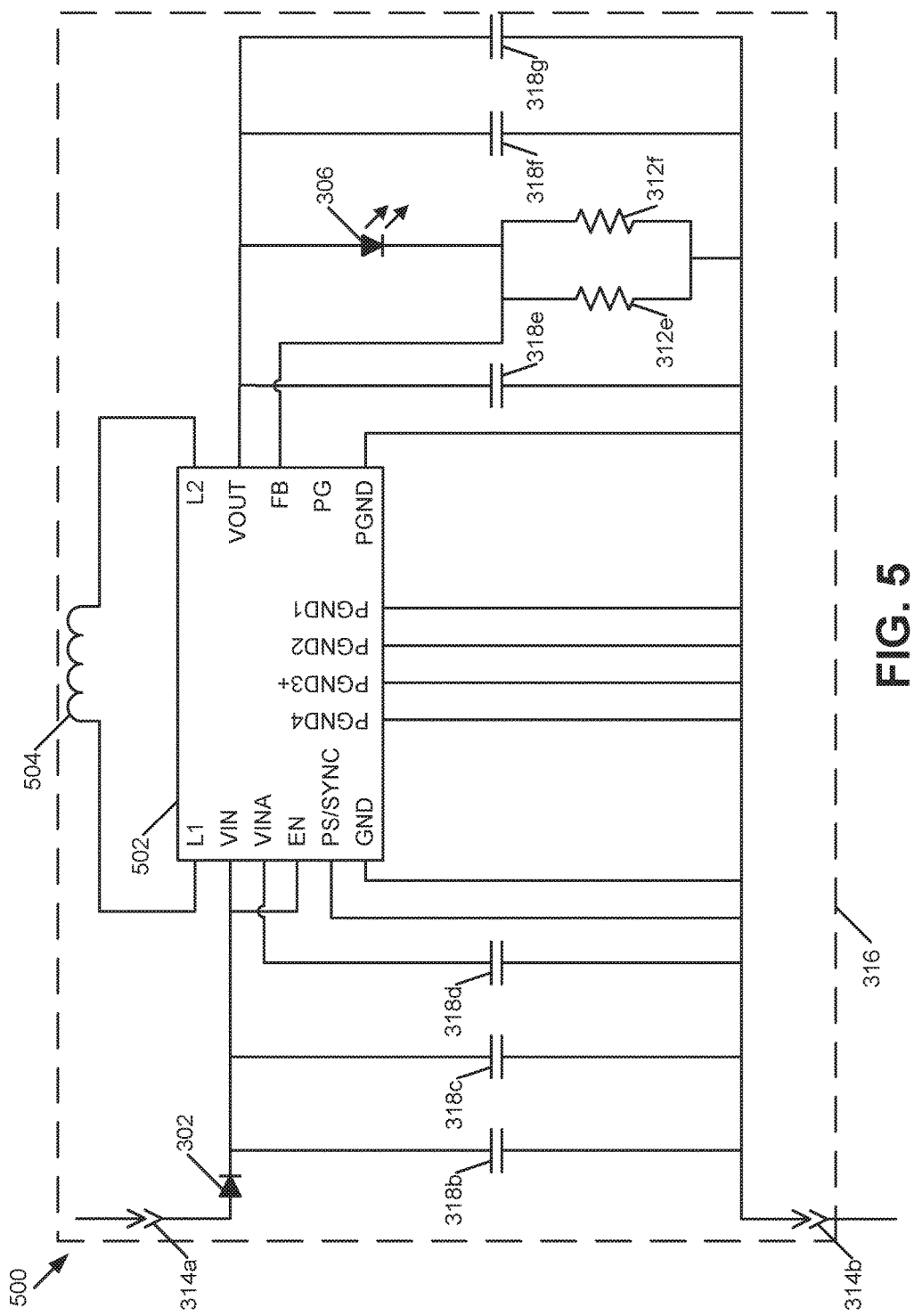
FIG. 5 is a circuit diagram illustrating an example luminaire suitable for implementing various embodiments.

FIG. 5 illustrates an example luminaire 500 suitable for implementing various embodiments. Each luminaire 106a-106f in FIGS. 1 and 2 may be implemented as an instance of the luminaire 500. The luminaire 500 may include various components, including a switching voltage regulator 502, an inductor 504, a diode 302, a capacitor 318b, 318c, 318d, 318e, 318f, 318g, an LED 306, a resistor 312e, 312f, and an input power connection 314a, 314b. In various embodiments, the components of the luminaire 500 may be electrically connected to a printed circuit board 316 having electrical conduit paths configured to electrically connect the components to each other in a designated manner, as described further herein.

The luminaire 500 may include input power connections 314a, 314b configured to electrically connect the luminaire 500 to the rest of the aircraft escape slide lighting systems 200a, 200b, as described herein with reference to FIG. 3. A diode 302 may be electrically connected to the positive input power connection 314a and may be configured to control the direction of the flow of current into the luminaire 500, as described herein with reference to FIG. 3.

A switching voltage regulator 502 may be configured to regulate a current provided to the luminaire 500 at the positive input power connection 314a by maintaining a constant voltage at an output of the switching voltage regulator 502. The switching voltage regulator 502 may include inductor connections ("L1" and "L2"), a voltage input connection ("VIN"), a voltage output connection ("VOUT"), voltage bias input connection ("VINA"), an enable input connection ("EN"), a voltage feedback connection ("FB"), and enable/disable power save mode and/or synchronization connection ("PS/SYNC"), a power good signal output connection ("PG"), a control ground connection ("GND"), and a power ground connection ("PGND", "PGND1", "PGND2", "PGND3+", and "PGND4"; various negative (ground) input power connections may be associated with components of the switching voltage regulator 502). An inductor 504 may be electrically connected between the inductor connections "L1", "L2" via first and second connection ends and configured to provide inductance that may be used to control of a rate of switching by the switching voltage regulator 502. The cathode of the diode 302 may be electrically connected to the voltage input connection "VIN". In various embodiments, any number of capacitors 318b, 318c, having a first connection end and a second connection end, may be electrically connected between the voltage input connection "VIN" and the negative (ground) input power connection 314b. In various embodiments, the diode 302 and the capacitors 318b, 318c may be electrically connected in parallel to the voltage input connection "VIN". The cathode of the diode 302 may be electrically connected to the enable input connection "EN". In various embodiments, any number of capacitors 318b, 318c may be electrically connected between the enable input connection "EN" and the negative (ground) input power connection 314b. In various embodiments, the diode 302 and the capacitors 318b, 318c may be electrically connected in parallel to the enable input connection "EN". A capacitor 318d, having a first connection end and a second connection end, may be electrically connected between the voltage bias input connection "VINA" and the negative (ground) input power connection 314b.

The anode of the LED 306 may be electrically connected to the voltage output connection "VOUT". In various embodiments, any number of capacitors 318e, 318f, 318g, having a first connection end and a second connection end, may be electrically connected between the voltage output connection "VOUT" and the negative (ground) input power connection 314b. In various embodiments, the LED 306 and the capacitors 318e, 318f, 318g may be electrically connected in parallel to the voltage output connection "VOUT". Any number of resistors 312e, 312f, which may be configured as a voltage dividing circuit resistor 312e, 312f, may be electrically connected at respective first connection ends to the cathode of the LED 306 in parallel. The voltage dividing circuit resistors 312e, 312f may be electrically connected at respective second connection ends to the negative (ground) input power connection 314b in parallel. The voltage feedback connection "FB" may also be electrically connected to the cathode of the LED 306. In various embodiments, the voltage feedback connection "FB" may be electrically connected between the cathode of the LED 306 and the respective first connection ends of the voltage dividing circuit resistors 312e, 312f in parallel. The enable/disable power save mode connection "PS/SYNC", the control ground connection "GND", and any number of the power ground connections "PGND", "PGND1", "PGND2", "PGND3+", "PGND4" may be electrically connected to the negative (ground) input power connection 314b.

In various embodiments, the diode 302, the switching voltage regulator 502, the capacitors 318b, 318c, 318d, 318e, 318f, 318g, and the voltage dividing circuit resistors 312e, 312f may make up an electrical current regulating circuit that may be configured to regulate a current provide to the luminaire 500 at the input power connections 314a, 314b. The electrical current regulating circuit may be configured as a discrete switching mode current regulator having any combination of discrete and/or integrated components. The electrical current regulating circuit may be configured as an integrated circuit switching mode current regulator having its components electrically connected to the printed circuit board 316. The electrical current regulating circuit may regulate the current provide to the luminaire 500 to provide a constant current to the LED 306 sufficient for the LED 306 to be operational to produce a designated light level, as discussed with reference to FIG. 3. The switching voltage regulator 502 may include various components configured to reduce (buck) or boost the voltage from the voltage input connection "VIN" to control the voltage at the voltage output connection "VOUT". The switching voltage regulator 502 may be configured to provide the constant current as a function of the voltage at the voltage output connection "VOUT". The switching voltage regulator 502 may sense the voltage at the voltage output connection "VOUT" as an input at the voltage feedback connection "FB". In various embodiments, the switching voltage regulator 502 may sense the voltage at the cathode of the LED 306 as an input at the voltage feedback connection "FB". The voltage at the cathode of the LED 306 may be a function of the voltage at the voltage output connection "VOUT" and the resistance/energy dispersion of the LED 306. The switching voltage regulator 502 may adjust the voltage of the voltage output connection "VOUT" based on a voltage sensed at the voltage input connection "VIN" and the voltage sensed at the voltage feedback connection "FB". The switching voltage regulator 502 may produce a voltage at the voltage output connection "VOUT" that corresponds with the constant current to provide to the LED 306 sufficient for the LED 306 to be operational to produce a designated light level. The constant current may include the designated current of the LED 306. The switching voltage regulator 502 may be configured to boost the voltage at the voltage output connection "VOUT" in response to the voltage sensed at the voltage feedback connection "FB" being lower than required to provide the constant current, and to reduce (buck) the voltage at the voltage output connection "VOUT" in response to the voltage sensed at the voltage feedback connection "FB" being higher than required to provide the constant current in various embodiments. The switching voltage regulator 502 may alternate between reducing (bucking) and boosting the voltage at the voltage output connection "VOUT" to maintain the voltage required to provide the constant current. In various embodiments, the current provided to the luminaire 500 may be regulated by the electrical current regulating circuit regardless of power supply variations, temperature changes, and/or circuit loading. In various embodiments, the electrical current regulating circuit may be configured in reduce (buck), boost, reduce (buck)/boost, single-ended primary-inductor converter (SEPIC), and/or charge (or energy) pump configurations.

Figure 6:
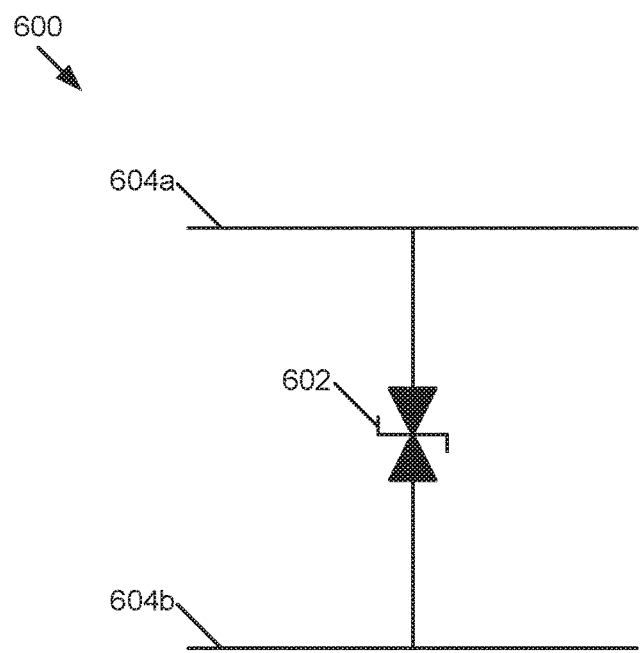
FIG. 6 is a circuit diagram illustrating an example surge protection circuit suitable for implementing various embodiments.

FIG. 6 illustrates an example surge protection circuit 600 suitable for implementing various embodiments. Each the surge protection circuits 204a and 204b in FIG. 2 may be implemented as an instance of the surge protection circuit 600. The surge protection circuit 600 may include a transient voltage suppression diode 602. The transient voltage suppression diode 602 may be electrically connected to the power bus 108 in parallel with any number of luminaires 106a-106f (implemented as any of the luminaires 300, 400, 500 described herein with reference to FIGS. 3-5). In various embodiments, the transient voltage suppression diode 602 may be electrically connected to a lead wire 604a, 604b. The lead wire 604a may electrically connect the transient voltage suppression diode 602 to the positive pole of the power source 202 and to the positive input power connection 314a of the luminaires 106a-106f. The lead wire 604b may electrically connect the transient voltage suppression diode 602 to the negative pole or ground of the power source 202 and to the negative (ground) input power connection 314b of the luminaires 106a-106f.

In various embodiments, the surge protection circuit 600 may be a centralized surge protection circuit 600, and the transient voltage suppression diode 602 may be connected to the power bus 108 in parallel with multiple luminaires 106a-106f. The transient voltage suppression diode 602 may be configured to prevent current exceeding a combined designated current level for all of the LEDs 306 for all of the luminaires 106a-106f. In response to an input voltage greater than a maximum designated input voltage for all of the luminaires 106a-106f, the transient voltage suppression diode 602 may shunt the current in excess of the combined designated current level to the ground.

In various embodiments, the surge protection circuit 600 may be a decentralized surge protection circuit 600, and the transient voltage suppression diode 602 may be connected to the power bus 108 in parallel with a single luminaire 106a-106f. In various embodiments, the decentralized surge protection circuit 600 may be a component of the luminaire 106a-106f, and may be electrically connected by the lead wires 604a, 604b to the printed circuit board 316. The transient voltage suppression diode 602 may be configured to prevent current exceeding a combined designated current level for all of the LEDs 306 for the luminaire 106a-106f from reaching the luminaire 106a-106f and/or the other components of the luminaire 106a-106f. In response to an input voltage greater than the maximum designated input voltage for a single luminaire 106a-106f, the transient voltage suppression diode 602 may shunt the current in excess of the combined designated current level to the ground.

Figure 7:
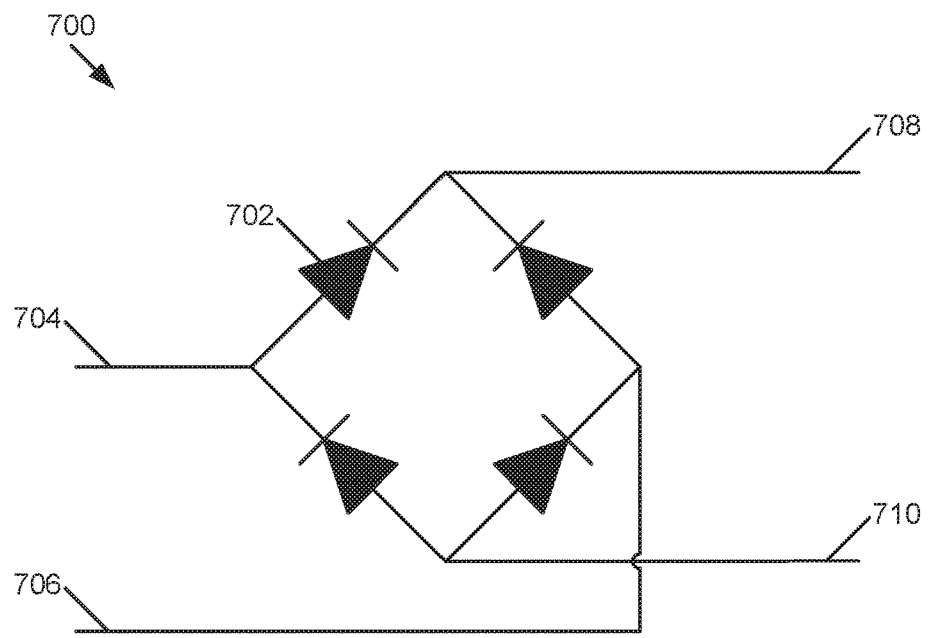
FIG. 7 is a circuit diagram illustrating an example polarity protection circuit suitable for implementing various embodiments.

FIG. 7 illustrates an example polarity protection circuit 700 suitable for implementing various embodiments. Each the polarity protection circuit 206a and 206b in FIG. 2 may be implemented as an instance of the polarity protection circuit 700. The polarity protection circuit 700 may include a diode bridge 702. The diode bridge 702 may be electrically connected to the power bus 108 in parallel with any number of luminaires 106a-106f (implemented as any of the luminaires 300, 400, 500 described herein with reference to FIGS. 3-5). In various embodiments, the diode bridge 702 may be electrically connected to a lead wire 704, 706, 708,710. The lead wire 704 may be electrically connected to an anode of a first diode and a cathode of a second diode of the diode bridge 702, and the lead wire 706 may be electrically connected to an anode of a third diode and a cathode of a fourth diode of the diode bridge 702. The lead wire 704 may be electrically connected to the positive pole of the power source 202 via the power bus 108, and the lead wire 706 may be electrically connected to the negative pole or ground of the power source 202. The lead wire 708 may be electrically connected to a cathode of the first diode and a cathode of the third diode of the diode bridge 702, and the lead wire 710 may be electrically connected to an anode of the second diode and an anode of the fourth diode of the diode bridge 702. The lead wire 704 may be electrically connected to a positive pole of the power source 202 via the power bus 108. The lead wire 710 may be electrically connected to the positive input power connection 314a of the luminaires 106a-106f, and the lead wire 708 may be electrically connected to the negative (ground) input power connection 314b of the luminaires 106a-106f. The first diode may be configured to allow positive current to flow from the lead wire 704 to the lead wire 708. The second diode may be configured to prevent positive current to flow from the lead wire 704 to the lead wire 710. The third diode may be configured to prevent negative current to flow from the lead wire 706 to the lead wire 708. The fourth diode may be configured to allow negative current to flow from the lead wire 706 to the lead wire 710.

In various embodiments, the polarity protection circuit 700 may be a centralized polarity protection circuit 700, and the diode bridge 702 may be connected to the power bus 108 in parallel with and multiple luminaires 106a-106f. The diode bridge 702 may be configured to prevent current of an opposite polarity than expected from reaching the luminaires 106a-106f. In response to an opposite voltage polarity than expected, the diode bridge 702 may modify a pass-through voltage so that voltage is applied with the correct polarity to the luminaires 106a-106f.

In various embodiments, the polarity protection circuit 700 may be a decentralized polarity protection circuit 700, and the diode bridge 702 may be connected to the power bus 108 in parallel with a single luminaire 106a-106f. In various embodiments, the decentralized polarity protection circuit 700 may be a component of the luminaire 106a-106f, and may be electrically connected by the lead wires 708, 710 to the printed circuit board 316. The diode bridge 702 may be configured to prevent an opposite voltage polarity than expected from reaching the luminaire 106a-106f and/or the other components of the luminaire 106a-106f. In response to an opposite voltage polarity current than expected, the diode bridge 702 may modify a pass-through voltage so that voltage is applied with the correct polarity to the luminaire 106a-106f and/or the other components of the luminaire 106a-106f.

Figure 8:
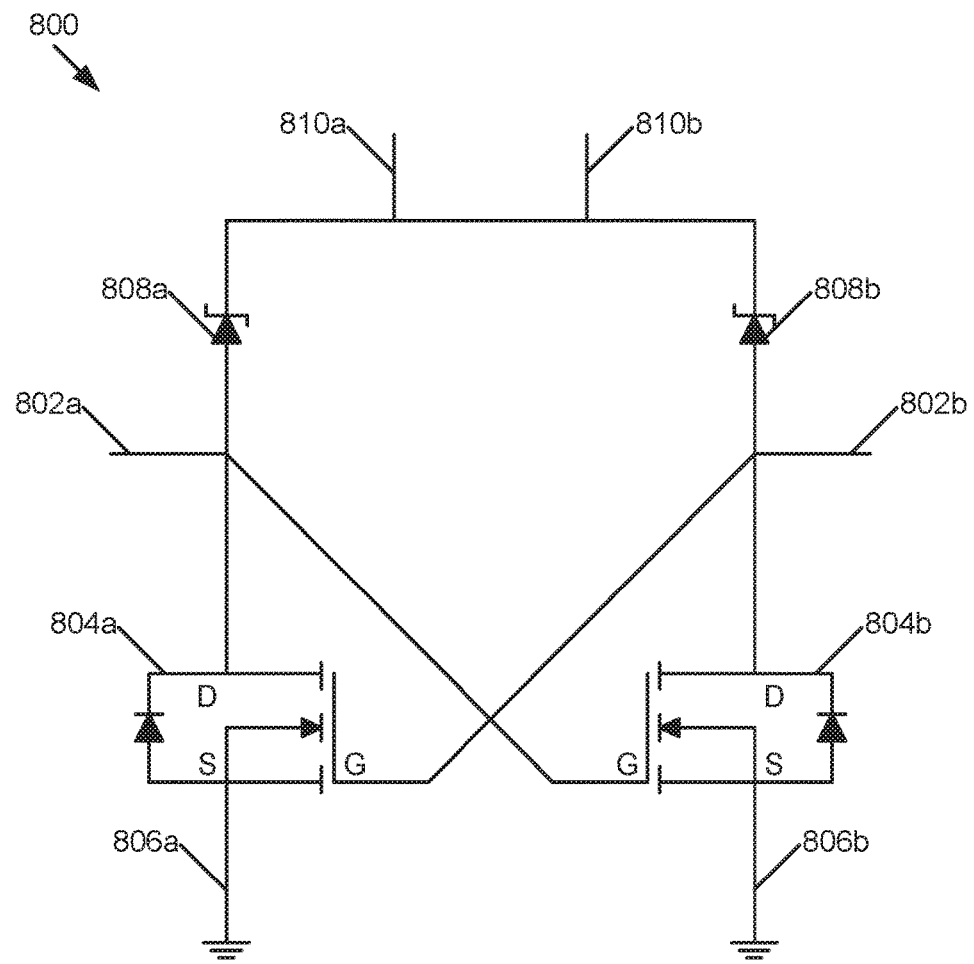
FIG. 8 is a circuit diagram illustrating an example polarity protection circuit suitable for implementing various embodiments.

FIG. 8 illustrates an example polarity protection circuit 800 suitable for implementing various embodiments. Each of the polarity protection circuit 206a and 206b in FIG. 2 may be implemented as an instance of the polarity protection circuit 800. The polarity protection circuit 800 may include a field effect transistor 804a, 804b and a Schottky diode 808a, 808b. The polarity protection circuit 800 may be electrically connected to the power bus 108 in parallel with any number of luminaires 106a-106f (implemented as any of the luminaires 300, 400, 500 described herein with reference to FIGS. 3-5). In various embodiments, the polarity protection circuit 800 may be electrically connected to a lead wire 802a, 802b, 806a, 806b, 810a, 810b. The lead wire 802a, an anode of a first Schottky diode 808a, a drain connection ("D") of a first field effect transistor 804a, a gate connection ("G") of a second field effect transistor 804b, and a positive pole of the power source 202 may all be electrically connected. The lead wire 806a may electrically connect the negative (ground) input power connection 314b of the luminaires 106a-106f to a source connection ("S") of the first field effect transistor 804a. The lead wire 810a may electrically connect a cathode of the first Schottky diode 808a to the positive input power connection 314a of the luminaires 106a-106f. Similarly, the lead wire 802b, an anode of a second Schottky diode 808b, a drain connection "D" of a second field effect transistor 804b, a gate connection "G" of the first field effect transistor 804a, and the negative pole of the power source 202 may all be electrically connected. The lead wire 806b may electrically connect the negative (ground) input power connection 314b of the luminaires 106a-106f to a source connection "S" of the second field effect transistor 804b. The lead wire 810b may electrically connect a cathode of the second Schottky diode 808b to the positive input power connection 314a of the luminaires 106a-106f. The cathodes of the Schottky diodes 808a, 808b may be electrically connected in parallel to the lead wires 810a, 810b.

The field effect transistor 804a, 804b, such as various types of MOSFETs, like a power MOSFET, may be configured to control the current flow between the negative pole or ground of the power source 202 and the negative (ground) input power connection 314b of the luminaires 106a-106f, and the rest of the polarity protection circuit 800. The Schottky diode 810a, 810b may control the direction of the current flow between the polarity protection circuit 800 and the positive input power connection 314a of the luminaires 106a-106f. An opposite polarity than expected current on the lead wire 802a received at the gate connection "G" of the second field effect transistor 804b may cause the second field effect transistor 804b to reduce its resistance to current flow and the second Schottky diode 808b may allow current to flow from the lead wire 802a to the lead wire 806b electrically connected to the negative or ground pole of the power source 202. Similarly, an opposite polarity than expected current on the lead wire 802b received at the gate connection "G" of the first field effect transistor 804a may cause the first field effect transistor 804a to reduce its resistance to current flow and the first Schottky diode 808a may allow current to flow from the lead wire 802b to the lead wire 806a electrically connected to the negative or ground pole of the power source 202.

In various embodiments, the polarity protection circuit 800 may be a centralized polarity protection circuit 800 and may be connected to the power bus 108 in parallel with multiple luminaires 106a-106f. The polarity protection circuit 800 may be configured to prevent voltage of an opposite polarity than expected from reaching the luminaires 106a-106f. In response to an opposite voltage polarity than expected, the polarity protection circuit 800 may modify the pass-through voltage so that voltage is applied with the correct polarity to the luminaires 106a-106f.

In various embodiments, the polarity protection circuit 800 may be a decentralized polarity protection circuit 800 and may be connected to the power bus 108 in parallel with a single luminaire 106a-106f. In various embodiments, the decentralized polarity protection circuit 800 may be a component of the luminaire 106a-106f, and may be electrically connected by the lead wires 806a, 806b, 810a, 810b, to the printed circuit board 316. The polarity protection circuit 800 may be configured to prevent voltage of an opposite polarity than expected from reaching the luminaire 106a-106f and/or the other components of the luminaire 106a-106f. In response to an opposite voltage polarity than expected, the polarity protection circuit 800 may modify the pass-through voltage so that voltage is applied with the correct polarity the luminaire 106a-106f and/or the other components of the luminaire 106a-106f.

Figure 9:
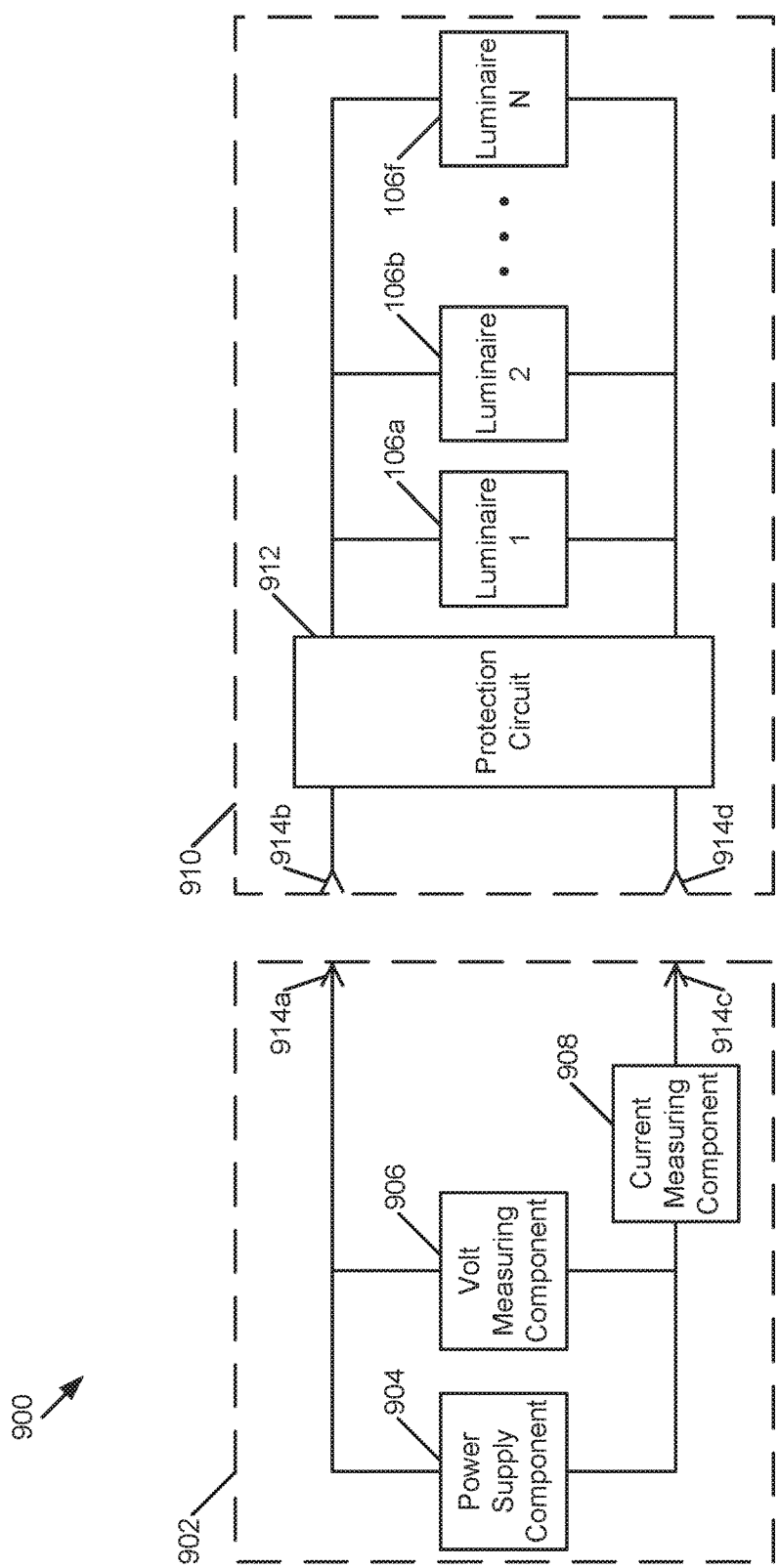
FIG. 9 is block a component block diagram illustrating an example of an apparatus for testing an aircraft escape slide lighting system including a plurality of luminaires according to various embodiments.

FIG. 9 illustrates an example of an system 900 for testing an aircraft escape slide lighting system 910 (implemented as any of the aircraft escape slide lighting systems 200a, 200b described herein with reference to FIGS. 2A and 2B), including a plurality of luminaires 106a-106f (implemented as any of the luminaires 300, 400, 500 described herein with reference to FIGS. 3-5) according to various embodiments. In various embodiments, the aircraft escape slide lighting system 910 may include a protection circuit 912 (implemented as any of the surge protection circuit 204a, 204b, 600 and/or the polarity protection circuit 206a, 206b, 700, 800 described herein with reference to FIGS. 2A, 2B, 6, 7, and 8). A testing device 902 may include a computing device configured to implement testing of the aircraft escape slide lighting system 910 in software executing in a processor, in general purpose hardware, in dedicated hardware, or in a combination of a software-configured processor and dedicated hardware, such as a processor executing software within a testing device 902 that includes other integrated and/or separate hardware and/or software components. The testing device 902 may include a power supply component 904, a volt measuring component 906 (e.g., a voltmeter), and a current measuring component 908 (e.g., an ammeter). The power supply component 904 may be configured as a regulated DC power supply component 904 to supply test input voltage ("$V_{test}$") to the escape slide lighting system 910. The volt measuring component 906 may be configured to confirm a level of test input voltage "$V_{test}$" supplied by regulated DC power supply component 904. The volt measuring component 906 may be electrically connected across outputs of the regulated DC power supply component 904 to measure the voltage across the outputs of the regulated DC power supply component 904 ("$V_{meas}$") and confirm that the regulated DC power supply component 904 provides the proper test input voltage "$V_{test}$". The current measuring component 908 may be configured to measure total current ("$A_{meas}$") in an aircraft escape slide lighting systems 910, and to determine whether some or all of the luminaires 106a-106f of the aircraft escape slide lighting systems 910 are operational. The testing device 902 may electrically connect to the aircraft escape slide lighting systems 910 via electrical connections 914a, 914b, 914c, 914d. The electrical connections of the 914b, 914d of the aircraft escape slide lighting systems 910 may allow the testing device 902 to connect to the power bus 108 of the aircraft escape slide lighting systems 910. In various embodiments, the testing device 902 may be configured to test the aircraft escape slide lighting systems 910 according to the method 1000 described herein with reference to FIG. 10.

Figure 10:
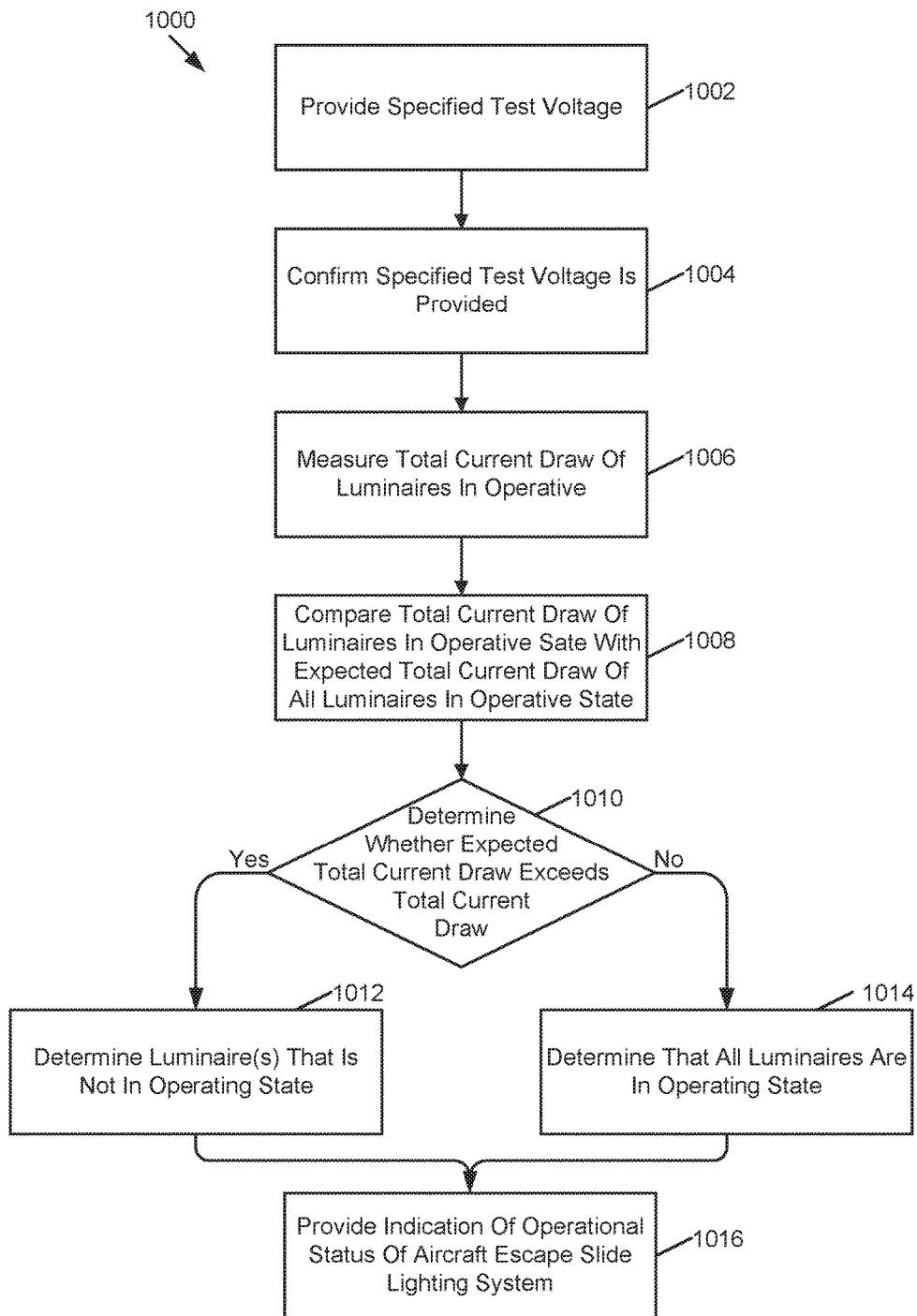
FIG. 10 is a process flow diagram illustrating a method for implementing testing of a luminaire according to various embodiments.

FIG. 10 illustrates a method 900 for implementing testing of a luminaire according to various embodiments. The method 900 may be implemented in a computing device in software executing in a processor, in general purpose hardware, in dedicated hardware, or in a combination of a software-configured processor and dedicated hardware, such as a processor executing software within a testing device 902 that may include other integrated and/or separate hardware and/or software components.

In block 902, the testing device 902 may supply and the aircraft escape slide lighting system 910 may receive a test input voltage "$V_{test}$". The test input voltage "$V_{test}$" may be configured to provide sufficient current for all of the LEDs 306 of the luminaires 106a-106f to be operational to produce a designated light level, as discussed with reference to FIG. 3. As described herein, the luminaires 106a-106f may be electrically connected in parallel. As such, an expected total current draw "$A_{exp}$" may be the sum of the designated current for each LED 306 or for each luminaire 106a-106f of the aircraft escape slide lighting systems 200a, 200b to be operational. In various embodiments, the testing device 902 may include a regulated DC power supply component 904 configured to provide the proper test input voltage "$V_{test}$" to the aircraft escape slide lighting system 910 so as to ensure that all operational LEDs 306 are provided with their respective design current level.

In block 1004, the testing device 902 may measure and confirm that the regulated DC power supply 920 is providing the proper test input voltage "$V_{test}$". In various embodiments, the volt measuring component 906 may measure the voltage between outputs of the regulated DC power supply 920 "$V_{meas}$" to measure the test input voltage "$V_{test}$". The testing device 902 may compare the measured voltage "$V_{meas}$" with a test input voltage "$V_{test}$", based on a designated test input voltage "$V_{test}$" for the configuration of the aircraft escape slide lighting system 910. The testing device 902 may determine that the measured voltage between the outputs of the regulated DC power supply 920 "$V_{meas}$" and the test input voltage "$V_{test}$" are equal or within a voltage threshold value from each other to confirm that the regulated DC power supply 920 is providing the proper test input voltage "$V_{test}$".

In block 1006, the testing device 902 may measure total current draw "$A_{meas}$" of the LEDs 306 that are operating in the aircraft escape slide lighting systems 910. The total current draw "$A_{meas}$" of the LEDs 306 that are operating in the aircraft escape slide lighting systems 910 may include the sum of the current draws of all of the operational the LEDs 306 or luminaires 106a-106f. In other words, the operational LEDs 306 or luminaires 106a-106f may each draw current the testing device 902 while non-operational LEDs 306 or luminaires 106a-106f may not draw their designed level current in order to be operational to produce a designated light level, including not drawing any current if none of the LEDs 306 or luminaires 106a-106f are operating. In various embodiments, the testing device 902 may include the current measuring component 908 configured to measure the total current draw "$A_{meas}$" by the LEDs 306 that are operating in the aircraft escape slide lighting systems 910.

In block 1008, the testing device 902 may compare the total measured current draw "$A_{meas}$" of the LEDs 306 that are operating in the aircraft escape slide lighting systems 910 with the total expected total current draw "$A_{exp}$" of the aircraft escape slide lighting system 910. In various embodiments, the testing device 902 may be configured to compare a pre-determined, acceptable and expected total current draw "$A_{exp}$" provided to the aircraft escape slide lighting systems 910, to a total measured current draw "$A_{meas}$" of the LEDs 306 that are operating in the aircraft escape slide lighting systems 910. In various embodiments, comparison of the expected total current draw "$A_{exp}$" and the total measured current draw "$A_{meas}$" may indicate an amount or a degree of the difference between the expected total current draw "$A_{exp}$" and the measured total current draw "$A_{meas}$".

In determination block 1010, the testing device 902 may determine whether the expected total current draw "$A_{exp}$" exceeds the total measured current draw "$A_{meas}$". The determination may be made based on the comparison of expected total current draw "$A_{exp}$" and the total measured current draw "$A_{meas}$" in block 1008.

In response to determining that the expected total current draw "$A_{exp}$" exceeds the total measured current draw "$A_{meas}$" (i.e., determination block 1010="Yes"), the testing device 902 may determine a luminaire(s) 106a-106f in the aircraft escape slide lighting systems 910 that is not in an operating state, or is inoperative, in block 1012. From the comparison of the total measured current draw "$A_{meas}$" and the expected total current draw "$A_{exp}$", the testing device 902 may determine that at least one of the luminaires 106a-106f, and therefore at least one of the LEDs 306, of the aircraft escape slide lighting systems 910 is not in an operating state. In various embodiments, the amount or degree of the difference between the total measured current draw "$A_{meas}$" and the expected total current draw "$A_{exp}$" from the comparison may be used to determine how many, and in some embodiments, which, the luminaires 106a-106f in the aircraft escape slide lighting systems 910 are not in an operating state. For example, each luminaire 106a-106f may have a designated current to be operational, which may be the same or different from any number of other luminaires 106a-106f in the aircraft escape slide lighting systems 910. The difference between the total measured current draw "$A_{meas}$" and the expected total current draw "$A_{exp}$" may be used to determine a number and/or type of luminaires 106a-106f that are not in an operating state.

In response to determining that the expected total current draw "$A_{exp}$" exceeds the total measured current draw "$A_{meas}$" (i.e., determination block 1010="No"), the testing device 902 may determine a luminaire(s) 106a-106f in the aircraft escape slide lighting systems 910 that is in an operating state, or is operative, in block 1014. From the comparison of the expected total current draw "$A_{exp}$" and total measured current draw "$A_{meas}$", the testing device 902 may determine that all of the luminaires 106a-106f, and therefore all of the LEDs 306, of the aircraft escape slide lighting systems 910 are in an operating state, or operative.

These determinations in block 1012, 1014 of how many and/or which luminaires 106a-106f are and/or are not in an operating state may be based on programmed data of specifications of aircraft escape slide lighting systems 910 and/or specific luminaire 106a-106f and/or aircraft escape slide lighting system 910.

In block 1016, the testing device 902 may provide an unambiguous indication of whether a luminaire 106a-106f is inoperative. Similarly, the testing device 902 may be configured to provide an unambiguous indication of all operative luminaires 106a-106f. In various embodiments, the indication may be made via a light and/or sound display of the testing device to provide a visual and/or audible indicator. In various embodiments, the indicator may indicate whether any luminaires 106a-106f are inoperative and/or whether all of the luminaires 106a-106f are operative. In various embodiments, the indicator may indicate a number, an identifier of a specific luminaire 106a-106f and/or type of luminaire 106a-106f, and/or a location of the inoperative luminaires 106a-106f.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. An electrical current regulating circuit of a luminaire, wherein the luminaire includes at least one light emitting diode (LED), a first wire connection of the luminaire is electrically connectable to a positive power supply via a diode, and a second wire connection of the luminaire is electrically connected to a circuit ground of the luminaire and electrically connectable to a power supply ground, the electrical current regulating circuit of the luminaire comprising:
   a voltage reference integrated circuit having a positive power supply input connection, a negative power supply input connection, and a voltage regulated output connection;

an operational amplifier integrated circuit having a positive power supply connection, a negative power supply input connection, a non-inverting input connection, an inverting input connection, and an output connection;

a plurality of resistors including a first resistor, a second resistor, and a third resistor, each of the plurality of resistors having a first connection end and a second connection end;

a field-effect transistor having a source connection, a drain connection, and a gate connection; and a capacitor having a first connection end and a second connection end, wherein:

the positive power supply input connection of the voltage reference integrated circuit is electrically connected to a cathode of the diode, the negative power supply input connection of the voltage reference integrated circuit is electrically connected to the second wire connection via the circuit ground, and the voltage regulated output connection of the voltage reference integrated circuit is electrically connected to the first connection end of the first resistor, the positive power supply connection of the operational amplifier integrated circuit is electrically connected to the cathode of the diode, the negative power supply input connection of the operational amplifier integrated circuit is electrically connected to the second wire connection via the circuit ground, the non-inverting input connection of the operational amplifier integrated circuit is electrically connected in parallel to the second connection end of the first resistor and to the first connection end of the second resistor, the inverting input connection of the operational amplifier integrated circuit is electrically connected in parallel to the first connection end of the third resistor and to the source connection of the field-effect transistor, and the output connection of the operational amplifier integrated circuit is electrically connected to the gate connection of the field-effect transistor, the drain connection of the field-effect transistor is electrically connected to a cathode of the LED, an anode of the LED is electrically connected to a cathode of the diode, the second connection end of the second resistor is electrically connected to the to the second wire connection via the circuit ground, the second connection end of the third resistor is electrically connected to the second wire connection via the circuit ground, and the first connection end of the capacitor is electrically connected to the cathode of the diode and the second connection end of the capacitor is electrically connected to the to the second wire connection via the circuit ground.

2. The electrical current regulating circuit of claim 1, wherein the field-effect transistor is a metal-oxide-semiconductor field-effect transistor.

3. The electrical current regulating circuit of claim 1, further comprising a printed circuit board configured to be electrically connected the diode, the voltage reference integrated circuit, the operational amplifier integrated circuit, the LED, the field-effect transistor, the first resistor, the second resistor, third resistor, and the capacitor, and the printed circuit board having the first wire connection and the second wire connection.

4. The electrical current regulating circuit of claim 1, wherein the electrical current regulating circuit is configured to use about 0.125 volts direct current or less.

5. The electrical current regulating circuit of claim 1, further comprising a surge protection circuit electrically connectable between the power supply and the electrical current regulating circuit.

6. The electrical current regulating circuit of claim 1, further comprising a surge protection circuit having a first connection electrically connectable to the power supply and a second connection electrically connected to the anode of the diode.

7. The electrical current regulating circuit of claim 1, wherein the electrical current regulating circuit comprises one of a plurality of electrical current regulating circuits, wherein each of the plurality of the electrical current regulating circuits is electrically connectable to the power supply.

8. The electrical current regulating circuit of claim 7, wherein each of the plurality of the electrical current regulating circuits is electrically connectable to one of a plurality of luminaires and configured to provide a current specified for operation of the at least one LED of the one of the plurality of luminaires, wherein a first current specified for a first luminaire of the plurality of luminaires and a second current specified for a second luminaire of the plurality of luminaires are different.

9. The electrical current regulating circuit of claim 7, wherein the plurality of electrical current regulating circuits are integral to an aircraft escape slide.

10. The electrical current regulating circuit of claim 9, wherein the power supply comprises at least one of an aircraft on-board emergency battery and an integral aircraft escape slide-mounted battery.

* * * * *